United States Patent
Hasegawa et al.

(10) Patent No.: US 8,147,949 B2
(45) Date of Patent: Apr. 3, 2012

(54) METHOD OF MANUFACTURING CERAMICS MOLDED COMPONENT AND MOLD EMPLOYED THEREFOR AS WELL AS CERAMIC COMPONENT

(75) Inventors: Masato Hasegawa, Itami (JP); Akihito Fujii, Osaka (JP)

(73) Assignee: Sumitomo Electric Industries, Ltd., Osaka-Shi (JP)

( * ) Notice: Subject to any disclaimer, the term of this patent is extended or adjusted under 35 U.S.C. 154(b) by 60 days.

(21) Appl. No.: 12/307,355

(22) PCT Filed: Jun. 28, 2007

(86) PCT No.: PCT/JP2007/063009
§ 371 (c)(1),
(2), (4) Date: Jan. 2, 2009

(87) PCT Pub. No.: WO2008/004489
PCT Pub. Date: Jan. 10, 2008

(65) Prior Publication Data
US 2009/0324912 A1 Dec. 31, 2009

(30) Foreign Application Priority Data

Jul. 3, 2006 (JP) ................................. 2006-183367

(51) Int. Cl.
*B32B 7/02* (2006.01)
*B29C 37/02* (2006.01)
*B29C 43/04* (2006.01)
*B29C 43/10* (2006.01)

(52) U.S. Cl. ......... 428/218; 425/406; 264/161; 264/319

(58) Field of Classification Search .................. 428/218; 264/319, 161; 425/406
See application file for complete search history.

(56) References Cited

U.S. PATENT DOCUMENTS

| 5,013,696 A | 5/1991 | Greskovich et al. |
| 5,314,646 A * | 5/1994 | Strobel et al. ..................... 264/6 |

(Continued)

FOREIGN PATENT DOCUMENTS

GB 2 082 161 3/1982

(Continued)

OTHER PUBLICATIONS

Machine English Translation, Shimizu, Method or Producing Optical Element and Mold for Forming Used for Production Thereof, Sep. 26, 2001, JPO, pp. 1-18.*

(Continued)

*Primary Examiner* — David Sample
*Assistant Examiner* — Tahseen N Khan
(74) *Attorney, Agent, or Firm* — Osha • Liang LLP

(57) ABSTRACT

A lower periphery constraint portion and an upper periphery constraint portion for molding the periphery of a lens as well as a mirror-finished optical molding surface and another mirror-finished optical molding surface are formed on a lower mold body and an upper mold body of a mold respectively. The upper periphery constraint portion and the lower periphery constraint portion are so formed as to have prescribed thicknesses $\alpha 1$ and $\alpha 2$ in a pressure axis direction respectively. A periphery nonconstraint portion not constraining ceramics when molding a ceramics material is provided between the lower mold body and the upper mold body. Thus, a ceramics molded component or the like is prevented from breakage and can be easily detached from the mold, so that the same can be more homogeneously densified.

35 Claims, 27 Drawing Sheets

U.S. PATENT DOCUMENTS

| | | | |
|---|---|---|---|
| 6,363,747 B1 * | 4/2002 | Budinski et al. | 65/26 |
| 2005/0285287 A1 * | 12/2005 | Okumura et al. | 264/2.5 |

FOREIGN PATENT DOCUMENTS

| | | | |
|---|---|---|---|
| JP | 41-412 | | 1/1966 |
| JP | 63-243901 | | 10/1988 |
| JP | 4-46025 | | 2/1992 |
| JP | 5-43359 | | 2/1993 |
| JP | 8-208243 | | 8/1996 |
| JP | 2001-261350 | | 9/2001 |
| JP | 2001-270724 | | 10/2001 |
| JP | 2001270724 A | * | 10/2001 |
| JP | 2005-1922 | | 1/2005 |
| JP | 2006-45038 | | 2/2006 |
| JP | 2006045038 A | * | 2/2006 |
| JP | 2006-88522 | | 4/2006 |

OTHER PUBLICATIONS

Machine English Translation, Hasegawa, Molding Die and Molding Method Using the Same, Feb. 16, 2006, JPO, pp. 1-38.*
International Search Report (English & Japanese) for PCT/JP2007/063009 mailed Oct. 2, 2007 (4 pages).
esp@cenet patent abstract JP2001270724 dated Oct. 2, 2001 (1 page).
esp@cenet patent abstract JP2006045038 dated Feb. 16, 2006 (1 page).
esp@cenet patent abstract for JP2001261350 dated Sep. 26, 2001 (1 page).
esp@cenet patent abstract JP2006088522 dated Apr. 6, 2006 (1 page).
esp@cenet patent abstract JP2005001922 dated Jan. 6, 2005 (1 page).
esp@cenet patent abstract JP8208243 dated Aug. 13, 1996 (1 page).
Partial translation of JP41-000412B dated Jan. 18, 1966 (5 pages).
Japan Patent Office Patent Publication Gazette for Patent Publication No. 41-412 dated Jan. 18, 1966 (1 page).
esp@cenet patent abstract JP5043359 dated Feb. 23, 1993 (1 page).
PCT International Preliminary Report on Patentability and English translation of Written Opinion of the International Searching Authority issued Jan. 6, 2009, 16 pages.
Extended European Search Report for European Application No. 07767802.7-1253, mailed on Aug. 31, 2009 (8 pages).
Patent Abstracts of Japan for Japanese Publication No. 63243901, Publication date Oct. 11, 1988 (1 page).
Patent Abstracts of Japan for Japanese Publication No. 04046025, Publication date Feb. 17, 1992 (1 page).

* cited by examiner

FIG.19

CHAMFERING AND FINISHED SURFACE TEST

| | MOLD STRUCTURE | UPPER MOLD BODY | | | LOWER MOLD BODY | | | SLEEVE (UPPER) | | SLEEVE (LOWER) | | MOLD RELEASABILITY | MOLD DURABILITY |
|---|---|---|---|---|---|---|---|---|---|---|---|---|---|
| | | CHAMFERING1 | FINISHING | CHAMFERING2 | CHAMFERING1 | FINISHING | CHAMFERING2 | CHAMFERING1 | FINISHING | CHAMFERING1 | FINISHING | | |
| EXAMPLE | A | YES | MIRROR SURFACE | NO | NO | MIRROR SURFACE | NO | | | | | △ | ○ |
| | | YES | MIRROR SURFACE | NO | YES | MIRROR SURFACE | NO | | | | | ○ | ○ |
| | B | YES | MIRROR SURFACE | YES | NO | MIRROR SURFACE | NO | | | | | ○ | ○ |
| | | YES | MIRROR SURFACE | YES | YES | MIRROR SURFACE | YES | | | | | ◎ | ○ |
| | | YES | MIRROR SURFACE | YES | YES | MIRROR SURFACE | YES | | | | | ◎ | ○ |
| | | YES | ROUGH SURFACE | YES | YES | ROUGH SURFACE | YES | | | | | △ | ○ |
| | C | YES | MIRROR SURFACE | NO | YES | MIRROR SURFACE | NO | NO | MIRROR SURFACE | NO | MIRROR SURFACE | △ | ○ |
| | | YES | MIRROR SURFACE | NO | YES | MIRROR SURFACE | NO | YES | MIRROR SURFACE | NO | MIRROR SURFACE | ○ | ○ |
| | D | YES | MIRROR SURFACE | YES | YES | MIRROR SURFACE | YES | NO | MIRROR SURFACE | NO | MIRROR SURFACE | ○ | ○ |
| | | YES | MIRROR SURFACE | YES | YES | MIRROR SURFACE | YES | YES | MIRROR SURFACE | NO | MIRROR SURFACE | ◎ | ○ |
| | | YES | MIRROR SURFACE | YES | YES | MIRROR SURFACE | YES | YES | MIRROR SURFACE | YES | MIRROR SURFACE | ◎ | ○ |
| | | YES | ROUGH SURFACE | YES | YES | ROUGH SURFACE | YES | YES | ROUGH SURFACE | YES | ROUGH SURFACE | △ | ○ |
| COMPARATIVE EXAMPLE | A | NO | ROUGH SURFACE | NO | NO | ROUGH SURFACE | NO | | | | | × | MOLD BROKEN |
| | C | NO | ROUGH SURFACE | NO | NO | ROUGH SURFACE | NO | NO | ROUGH SURFACE | NO | ROUGH SURFACE | × | MOLD BROKEN |

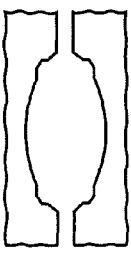
MOLD STRUCTURE A

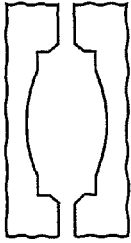
MOLD STRUCTURE B

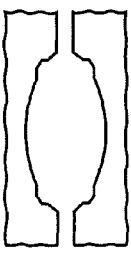
MOLD STRUCTURE C

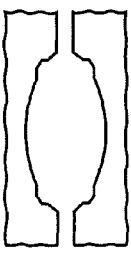
MOLD STRUCTURE D

◎ REMARKABLY EXCELLENT
○ EXCELLENT
△ SLIGHTLY EXCELLENT
× INFERIOR

FIG.23

| | MOLD STRUCTURE | DRAFT ANGLE | | | | | | | MOLD RELEASABILITY |
|---|---|---|---|---|---|---|---|---|---|
| | | UPPER MOLD BODY | | LOWER MOLD BODY | | SLEEVE (UPPER) | | SLEEVE (LOWER) | |
| | | DRAFT ANGLE | FINISHING | DRAFT ANGLE | FINISHING | DRAFT ANGLE | FINISHING | DRAFT ANGLE | FINISHING | |
| EXAMPLE | A | YES | ROUGH SURFACE | NO | ROUGH SURFACE | / | / | / | / | △ |
| | | YES | ROUGH SURFACE | YES | ROUGH SURFACE | / | / | / | / | ○ |
| | | YES | MIRROR SURFACE | NO | MIRROR SURFACE | / | / | / | / | ○ |
| | | YES | MIRROR SURFACE | YES | MIRROR SURFACE | / | / | / | / | ◎ |
| | B | / | / | / | / | NO | ROUGH SURFACE | NO | MIRROR SURFACE | △ |
| | | / | / | / | / | YES | ROUGH SURFACE | NO | MIRROR SURFACE | ○ |
| | | / | / | / | / | NO | MIRROR SURFACE | NO | MIRROR SURFACE | ○ |
| | | / | / | / | / | YES | MIRROR SURFACE | NO | MIRROR SURFACE | ◎ |
| COMPARATIVE EXAMPLE | C | NO | ROUGH SURFACE | NO | ROUGH SURFACE | / | / | / | / | △ |
| | D | / | / | / | / | NO | ROUGH SURFACE | NO | ROUGH SURFACE | △ |

◎ REMARKABLY EXCELLENT
○ EXCELLENT
△ SLIGHTLY EXCELLENT

MOLD STRUCTURE A  MOLD STRUCTURE B  MOLD STRUCTURE C  MOLD STRUCTURE D

FIG.24

| CERAMICS PREFORM | | UPPER AND LOWER MOLD BODIES | | | | CERAMICS MOLDED PRODUCT (OPTICAL ELEMENT) | | | RESULT |
|---|---|---|---|---|---|---|---|---|---|
| OUTER DIAMETER (mm) | WEIGHT (g) | MATERIAL | DIAMETER OF SIDE SURFACE CONSTRAINT PORTION (mm) | $\alpha 1$ (mm) | $\alpha 2$ (mm) | RELATIVE DENSITY (%) | CENTRAL THICKNESS (mm) | TRANSMITTANCE AT WAVELENGTH OF 10 $\mu$m(%) | |
| $\phi 8$ | 0.1 | GC | $\phi 8$ | 0.75 | 0.75 | 95.0% | 2.0 | 0% | × |
| $\phi 8$ | 0.6 | GC | $\phi 8$ | 0.75 | 0.75 | 99.8% | 3.15 | 75 | ◎ |
| $\phi 8$ | 0.8 | GC | $\phi 8$ | 0.75 | 0.75 | 99.8% | 3.65 | 75 | ◎ |
| $\phi 8$ | 0.9 | GC | $\phi 8$ | 0.75 | 0.75 | 99.8% | 3.90 | 75 | ◎ |
| $\phi 8$ | 0.95 | GC | $\phi 8$ | 0.75 | 0.75 | 99.8% | 4.00 | 75 | ◎ |
| $\phi 8$ | 1 | GC | $\phi 8$ | 0.75 | 0.75 | 99.8% | 4.15 | 75 | ◎ |
| $\phi 8$ | 1.5 | GC | $\phi 8$ | 0.75 | 0.75 | 99.8% | 5.40 | 75 | ◎ |
| $\phi 8$ | 0.6 | GC | $\phi 8$ | 0.5 | 0.5 | 99.8% | 3.00 | 75 | ◎ |
| $\phi 8$ | 0.8 | GC | $\phi 8$ | 0.5 | 0.5 | 99.8% | 3.40 | 75 | ◎ |
| $\phi 8$ | 1 | GC | $\phi 8$ | 0.5 | 0.5 | 99.8% | 3.90 | 75 | ◎ |
| $\phi 8$ | 1.2 | GC | $\phi 8$ | 0.5 | 0.5 | 99.8% | 4.30 | 75 | ◎ |
| $\phi 8$ | 0.6 | GC | $\phi 8$ | 1 | 1 | 99.8% | 3.25 | 75 | ◎ |
| $\phi 8$ | 0.8 | GC | $\phi 8$ | 1 | 1 | 99.8% | 3.80 | 75 | ◎ |
| $\phi 8$ | 1 | GC | $\phi 8$ | 1 | 1 | 99.8% | 4.35 | 75 | ◎ |
| $\phi 8$ | 1.2 | GC | $\phi 8$ | 1 | 1 | 99.8% | 4.90 | 75 | ◎ |
| $\phi 8$ | 0.7 | GRAPHITE | $\phi 8$ | 1.6 | 1.6 | 99.8% | 3.85 | 75 | ◎ |
| $\phi 8$ | 0.71 | GRAPHITE | $\phi 8$ | 1.4 | 1.4 | 99.8% | 3.81 | 75 | ◎ |
| $\phi 8$ | 0.7 | GRAPHITE | $\phi 8$ | 1.4 | 1.4 | 99.8% | 3.78 | 75 | ◎ |
| $\phi 8$ | 0.67 | GRAPHITE | $\phi 8$ | 1.4 | 1.4 | 99.8% | 3.68 | 75 | ◎ |
| $\phi 8$ | 0.7 | GRAPHITE | $\phi 8$ | 1.2 | 1.2 | 99.8% | 3.67 | 75 | ◎ |
| $\phi 8$ | 0.7 | GRAPHITE | $\phi 8$ | 0.5 | 0.5 | 99.8% | 3.25 | 75 | ◎ |

DEPTH OF PERIPHERY CONSTRAINT PORTION-WEIGHT OF MOLDED OBJECT-MOLD MATERIAL

◎ REMARKABLY EXCELLENT
× INFERIOR

FIG.26

| CERAMICS PREFORM | | | UPPER AND LOWER MOLD BODIES | | | | | | CERAMICS MOLDED COMPONENT (OPTICAL ELEMENT) | | | | | | RESULT | |
|---|---|---|---|---|---|---|---|---|---|---|---|---|---|---|---|---|
| OUTER DIAMETER (mm) | WEIGHT (g) | MATERIAL AND SHAPE | DIAMETER OF SIDE SURFACE CONSTRAINT PORTION (mm) | α1 (mm) | α2 (mm) | α1+α2 | γ (α2/α1) | THICKNESS OF CONSTRAINT PORTION (mm): α1+α2 | THICKNESS OF NONCONSTRAINT PORTION (mm): α3 | β ((α1+α2)/α3) | CENTRAL THICKNESS (mm) | MAXIMUM DIAMETER (mm) | TRANSMITTANCE AT WAVELENGTH OF 10μm (%) | CENTRAL DENSITY (%) | NEAR DENSITY (%) | UNMOLDABILITY | NEAR DENSITY |
| φ8 | 0.7 | GC FLAT PLATE | — | 0 | 0 | 0 | — | 0.0 | 2.3 | 0 | 2.3 | 10.67 | 75 | 99.8% | 90.0% | ◎ | △ |
| φ8 | 0.7 | GC SPHERICAL SURFACE | φ8 | 1.65 | 1.65 | 3.3 | 1.0 | 3.3 | 0.02 | 165 | 3.9 | 8.0 | 25 | 98.0% | 95.0% | × | ○ |
| φ8 | 0.7 | GC SPHERICAL SURFACE | φ8 | 1.595 | 1.595 | 3.19 | 1.0 | 3.2 | 0.06 | 53 | 3.85 | 8.4 | 50 | 98.5% | 98.0% | ○ | ○ |
| φ8 | 0.7 | GC SPHERICAL SURFACE | φ8 | 1.45 | 1.45 | 3 | 1.0 | 3.0 | 0.29 | 10 | 3.8 | 8.4 | 65 | 99.0% | 99.0% | ○ | ○ |
| φ8 | 0.7 | GC SPHERICAL SURFACE | φ8 | 1.25 | 1.25 | 2.5 | 1.0 | 2.5 | 0.5 | 5.0 | 3.6 | 9.2 | 72 | 99.8% | 99.5% | ○ | ◎ |
| φ8 | 0.7 | GC SPHERICAL SURFACE | φ8 | 1 | 1 | 2 | 1.0 | 2.0 | 0.85 | 2.4 | 3.5 | 9.4 | 75 | 99.8% | 99.8% | ◎ | ◎ |
| φ8 | 0.7 | GC SPHERICAL SURFACE | φ8 | 0.75 | 0.75 | 1.5 | 1.0 | 1.5 | 1.3 | 1.2 | 3.4 | 10.0 | 75 | 99.8% | 99.8% | ◎ | ◎ |
| φ8 | 0.7 | GC SPHERICAL SURFACE | φ8 | 0.05 | 0.05 | 0.1 | 1.0 | 0.1 | 2.4 | 0.04 | 3.15 | 10.3 | 75 | 99.8% | 95.0% | ◎ | ○ |
| φ8 | 0.7 | GC SPHERICAL SURFACE | φ8 | 0 | 0 | 0 | — | 0.0 | 2.5 | 0.0 | 3.1 | 10.4 | 75 | 99.8% | 90.0% | ◎ | △ |
| φ8 | 0.7 | GC SPHERICAL SURFACE | φ8 | 1.5 | 0 | 1.5 | 0 | 1.5 | 1.3 | 1.2 | 3.4 | 10.0 | 75 | 99.8% | 99.0% | △ WEAKLY STUCK TO UPPER MOLD BODY | ◎ |
| φ8 | 0.7 | GC SPHERICAL SURFACE | φ8 | 0 | 0.75 | 0.75 | — | 0.75 | 1.9 | 0.4 | 3.3 | 10.2 | 75 | 99.8% | 99.8% | ◎ | ◎ |
| φ8 | 0.7 | GC SPHERICAL SURFACE | φ8 | 0 | 1 | 1 | — | 1.0 | 1.7 | 0.6 | 3.3 | 10.1 | 75 | 99.8% | 99.8% | ○ | ○ |
| φ8 | 0.7 | GC SPHERICAL SURFACE | φ8 | 0 | 3 | 3 | — | 3.0 | 0.1 | 30 | 3.7 | 9.5 | 75 | 99.8% | 99.8% | △ | ◎ |
| φ8 | 0.7 | GC SPHERICAL SURFACE | φ8 | 0 | 3.09 | 3.09 | — | 3.1 | 0.0 | 110 | 3.7 | 9.5 | 75 | 99.8% | 99.8% | × | ◎ |
| φ8 | 0.7 | GC SPHERICAL SURFACE | φ8 | 1 | 0.5 | 1.5 | 0.5 | 1.5 | 1.3 | 1.2 | 3.4 | 10.0 | 75 | 99.8% | 99.8% | ◎ | ◎ |
| φ8 | 0.7 | GC SPHERICAL SURFACE | φ8 | 0.43 | 1.07 | 1.5 | 2.5 | 1.5 | 1.3 | 1.2 | 3.4 | 10.0 | 75 | 99.8% | 99.8% | ○ | ◎ |
| φ8 | 0.7 | GC SPHERICAL SURFACE | φ8 | 0.25 | 1.25 | 1.5 | 5 | 1.5 | 1.3 | 1.2 | 3.4 | 10.0 | 75 | 99.8% | 99.8% | ◎ | ◎ |
| φ8 | 0.7 | GC SPHERICAL SURFACE | φ8 | 0.14 | 1.36 | 1.5 | 10 | 1.5 | 1.3 | 1.2 | 3.4 | 10.0 | 75 | 99.8% | 99.8% | ○ | ◎ |
| φ20 | 8.15 | GC FLAT PLATE | φ20 | 1.3 | 1.3 | 2.6 | 1 | 2.6 | 2.9 | 0.9 | 5.4 | 24.0 | 75 | 99.8% | 99.8% | ◎ | ◎ |
| φ20 | 8.3 | GC FLAT PLATE | φ20 | 1.7 | 1.7 | 3.4 | 1 | 3.4 | 2.4 | 1.4 | 5.8 | 23.3 | 75 | 99.8% | 99.0% | ◎ | ◎ |
| φ20 | 8.2 | GC FLAT PLATE | φ20 | 0 | 1.3 | 1.3 | — | 1.3 | 1.3 | 1.0 | 5.10 | 24.5 | 75 | 99.8% | 99.8% | ◎ | ◎ |
| φ40 | 39 | GC FLAT PLATE | φ40 | 0.75 | 0.75 | 1.5 | 1 | 1.5 | 4.7 | 0.3 | 6.2 | 47.6 | 75 | 99.8% | 99.8% | ◎ | ◎ |

◎ REMARKABLY EXCELLENT
○ EXCELLENT
△ SLIGHTLY EXCELLENT
× INFERIOR

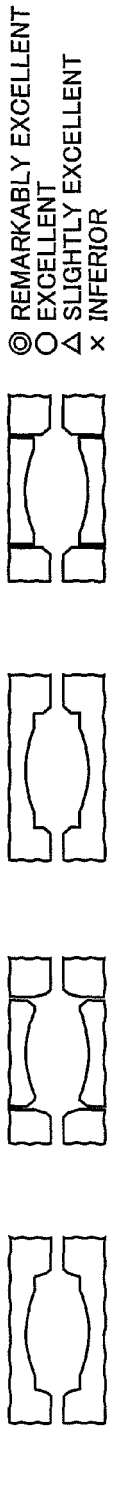

| | MEMBER 1 | | MEMBER 2 | | COEFFICIENT OF KINETIC FRICTION | RESULT |
|---|---|---|---|---|---|---|
| | NAME | MATERIAL | NAME | MATERIAL | | |
| EXAMPLE | CERAMICS PREFORM | ZnS | UPPER AND LOWER MOLD BODIES | GC MIRROR SURFACE | 0.4 | ◎ |
| | CERAMICS PREFORM | ZnS | SLEEVE | GC MIRROR SURFACE | 0.4 | ◎ |
| | CERAMICS PREFORM | ZnS | SLEEVE | GC ROUGH SURFACE (Ra∼0.1) | 0.6 | ○ |
| | CERAMICS PREFORM | ZnS | ASSEMBLY MOLD SECTION | GRAPHITE | 0.4 | ◎ |
| | UPPER AND LOWER MOLD BODIES | GC MIRROR SURFACE | SLEEVE | PYROLYTIC CARBON-COATED GRAPHITE | 0.4 | ◎ |
| | UPPER AND LOWER MOLD BODIES | GC MIRROR SURFACE | BARREL MOLD | SiC MIRROR SURFACE | 0.3 | ◎ |
| | UPPER AND LOWER MOLD BODIES | GC MIRROR SURFACE | PRESS SLEEVE | SiC MIRROR SURFACE | 0.4 | ◎ |
| | SPACER | SiC MIRROR SURFACE | PRESS SLEEVE | GRAPHITE | 0.4 | ◎ |
| COMPARATIVE EXAMPLE | CERAMICS PREFORM | ZnS | SLEEVE | GC ROUGH SURFACE (Ra>0.2 μm) | 0.7 | × SLEEVE BROKEN IN UNMOLDING |
| | UPPER AND LOWER MOLD BODIES | GC ROUGH SURFACE | SLEEVE | B4C ROUGH SURFACE (Ra>0.2 μm) | 0.7 | × NOT DENSIFIABLE |

◎ REMARKABLY EXCELLENT
○ EXCELLENT
× INFERIOR

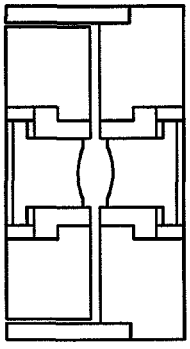
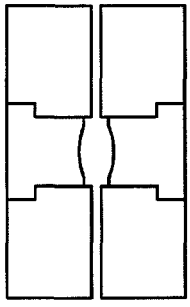
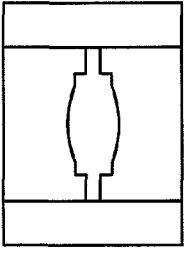

FIG.29

| | CERAMICS PREFORM | | THERMAL EXPANSION TEST | | | RESULT OF MOLDING | SHAPE OF OPTICAL ELEMENT (CERAMICS MOLDED PRODUCT) |
|---|---|---|---|---|---|---|---|
| | | THERMAL EXPANSION COEFFICIENT | MEMBER | | | | |
| | MATERIAL | | NAME | MATERIAL | THERMAL EXPANSION COEFFICIENT | | |
| EXAMPLE | ZnS | $7.0 \times 10^{-6}$ | UPPER MOLD BODY: 凹 | GC | $2.0 \times 10^{-6}$ | ◎ | BICONVEX LENS |
| | | | LOWER MOLD BODY: 凹 | SiC | $3.7 \times 10^{-6}$ | ◎ | |
| | | | SLEEVE | GC | $2.0 \times 10^{-6}$ | ◎ | |
| | | | ASSEMBLY MOLD SECTION | GRAPHITE | $5.5 \times 10^{-6}$ | ◎ | |
| | ZnS | $7.0 \times 10^{-6}$ | UPPER MOLD BODY: 凸 | TiN | $9.2 \times 10^{-6}$ | ◎ | MENISCUS LENS |
| | | | LOWER MOLD BODY: 凹 | GC | $2.0 \times 10^{-6}$ | ◎ | |
| | | | SLEEVE | GC | $2.0 \times 10^{-6}$ | ◎ | |
| | | | ASSEMBLY MOLD SECTION | GRAPHITE | $5.5 \times 10^{-6}$ | ◎ | |
| | ZnS | $7.0 \times 10^{-6}$ | UPPER MOLD BODY: 凸 | GC | $2.0 \times 10^{-6}$ | ○ | BICONCAVE LENS |
| | | | LOWER MOLD BODY: 凸 | GC | $2.0 \times 10^{-6}$ | ◎ | |
| | | | SLEEVE | GC | $2.0 \times 10^{-6}$ | ◎ | |
| | | | ASSEMBLY MOLD SECTION | GRAPHITE | $5.5 \times 10^{-6}$ | ◎ | |
| COMPARATIVE EXAMPLE | ZnS | $7.0 \times 10^{-6}$ | SLEEVE | Pb | $28 \times 10^{-6}$ | × LENS CHIPPED | BICONVEX LENS |

◎ REMARKABLY EXCELLENT
○ EXCELLENT
× INFERIOR

FIG.31

| | | HIGH MELTING POINT/BENDING STRENGTH TEST | | | | |
|---|---|---|---|---|---|---|
| | NAME OF MEMBER | MATERIAL | RELATIVE DENSITY | MELTING POINT, GLASS TRANSITION POINT, SUBLIMATION POINT | BENDING STRENGTH/MOLDING PRESSURE (%) | RESULT |
| EXAMPLE | UPPER AND LOWER MOLD BODIES | GC | ABOUT 100% | 2000°C | 300% | ◎ |
| | UPPER AND LOWER SLEEVES | GRAPHITE | 79% | 3500°C | 66% | ○ |
| | UPPER AND LOWER ASSEMBLY MOLD SECTIONS | SiC | 99.70% | 2600°C | 1000% | ◎ |
| | SPACER | POROUS SiC | 70% | 2600°C | 170% | ◎ |
| COMPARATIVE EXAMPLE | UPPER AND LOWER MOLD BODIES | POROUS ALUMINA | 20% | 2000°C | 15% | × BROKEN |

◎ REMARKABLY EXCELLENT
○ EXCELLENT
× INFERIOR

METHOD OF MANUFACTURING CERAMICS MOLDED COMPONENT AND MOLD EMPLOYED THEREFOR AS WELL AS CERAMIC COMPONENT

TECHNICAL FIELD

The present invention relates to a method of manufacturing a ceramics molded component and a mold employed therefor as well as a ceramics component, and more particularly, it relates to a method of manufacturing a ceramics molded component for pressure-sintering and molding ceramics powder as an optical component, a mold used for such molding of ceramics, and a ceramics component manufactured with such a mold.

BACKGROUND ART

An optical component such as a lens or a window material is used for an optical device utilizing light of a prescribed wavelength. When light (visible light) of the visible region is utilized as the light, glass is mainly applied as the material for the optical component. In the case of glass, the optical component is manufactured by heating glass to a temperature softening and plasticity-deforming the glass and thereafter pressure-deforming the glass to a prescribed shape with a prescribed mold. For example, each of Patent Document 1 (Japanese Patent Laying-Open No. 2001-270724) and Patent Document 2 (Japanese Patent Laying-Open No. 8-208243) proposes such a method of preparing an optical component from glass.

In a case of utilizing light (infrared light) in the infrared region or light (ultraviolet light) in the ultraviolet region in place of the visible light, on the other hand, ceramics is applied as the material for the optical component. In the case of ceramics, sintering of ceramics is utilized, whereby it follows that a ceramics sintered body (molded product) is manufactured as the optical component by starting pressurization from a prescribed temperature for heating the ceramics and starting sintering the same and densifying the ceramics. For example, each of Patent Document 3 (Japanese Patent Publication Gazette No. 41-412) and Patent Document 4 (Japanese Patent Laying-Open No. 5-43359) proposes such a method of manufacturing an optical component from ceramics.

Patent Document 1: Japanese Patent Laying-Open No. 2001-270724
Patent Document 2: Japanese Patent Laying-Open No. 8-208243
Patent Document 3: Japanese Patent Publication Gazette No. 41-412
Patent Document 4: Japanese Patent Laying-Open No. 5-43359

DISCLOSURE OF THE INVENTION

Problems to be Solved by the Invention

In order to prepare an optical component from ceramics, however, the following problems must be solved: An optical component of ceramics is manufactured by pressure sintering for densifying ceramics with a prescribed mold through the lateral pressure of this mold. After the pressure sintering, the mold is detached and it follows that a ceramics molded component for forming the optical component is taken out. When the mold is detached from the ceramics molded component, prescribed force is supplied to the mold along a uniaxial direction (pressure axis direction).

However, force going to radially spread acts on the ceramics molded component for forming the optical component in the mold, due to the pressure sintering. When the mold is detached, therefore, the ceramics molded component itself may be broken or the mold may be broken. Further, detachment of the mold requires labor due to such force acting on the mold.

In addition, densification of the ceramics molded component may be inhomogeneous in the ceramics molded component due to dispersion in the loading weight or fluidity of the ceramics.

The present invention has been proposed in order to solve the aforementioned problems, an object thereof is to provide a method of manufacturing a ceramics molded component capable of preventing a ceramics molded component or a mold from breakage and easily detaching the mold from the ceramics molded component and capable of attaining more homogeneous densification, another object is to provide a mold used for manufacturing such a ceramics molded component, and still another object is to provide a ceramics component manufactured with such a mold.

Means for Solving the Problems

The method of manufacturing a ceramics molded component according to the present invention is a method of manufacturing a ceramics molded component for manufacturing a ceramics molded component of a prescribed shape by pressure-sintering a ceramics preform with a prescribed mold having an upper mold section and a lower mold section, forming the ceramics molded component by pressure-sintering the ceramics preform while employing a mold comprising a periphery constraint portion regulating deformation of the ceramics preform in the peripheral direction for molding the periphery of the ceramics preform on at least either one of the upper mold section and the lower mold section and comprising a periphery nonconstraint portion allowing deformation of the ceramics preform in the peripheral direction as the mold.

According to this method, the mold is so provided with the periphery nonconstraint portion that force of ceramics preform going to spread in the radial direction due to the pressure sintering does not excessively act on the mold but the mold can be easily detached. Further, the mold can be so easily detached that the mold and the unmolded ceramics molded component can be prevented from damages such as cracking and chipping (improvement of detachability of the mold (improvement in unmoldability)). Thus, the ceramics molded component can be automatically manufactured, and productivity is improved.

The ceramics preform is not further densified when prescribed densification is attained by pressurization, whereby the pressure can be constant-controlled. Thus, a ceramics molded component exhibiting desired optical functions etc. can be stably manufactured (stable densification).

Preferably, the ceramics preform is presintered before the ceramics preform is pressure-sintered.

Thus, the ceramics preform is not easily broken but can be relatively easily handled before the pressure sintering.

Preferably, the ceramics molded component is taken out from the mold after the pressure-sintering step of forming the ceramics molded component so that a radially protruding part, remaining along the periphery, located on the periphery nonconstraint portion is removed in the unmolded ceramics molded component.

Thus, the excess part of the ceramics molded component located on the periphery nonconstraint portion is removed, and the ceramics molded component is completed.

Preferably in the pressure-sintering step of pressure-sintering the ceramics preform, the said ceramics preform is pressure-sintered by employing a mold having the periphery nonconstraint portion provided between the upper mold section and the lower mold section as the mold.

In this case, the periphery constraint portion of the upper mold section or the lower mold section prevents deformation of the ceramics preform in the pressure axis direction (direction perpendicular to the radial direction), thereby controlling the thickness of the ceramics preform. Further, a lateral pressure assisting the pressure sintering can be so developed that densification for attaining a desired mechanical or optical function, particularly the density of the ceramics preform in the vicinity of the periphery nonconstraint portion can be improved. A ceramics molded component having a desired central thickness can be precisely manufactured by optimizing the size, the weight and the volume of the ceramics preform, the length of the periphery constraint portion and the molding pressure (control of dimensional accuracy).

Preferably in the pressure-sintering step, the ceramics preform is pressure-sintered by employing a mold chamfered on at least either one of an outer corner and an inner corner in a portion coming into contact with the ceramics preform as the mold.

In this case, the mold is so chamfered that the mold can be more easily detachable after the pressure sintering, and the mold is neither cracked nor broken.

Preferably in the pressure-sintering step, the ceramics preform is pressure-sintered by employing a mold mirror-finished on a portion coming into contact with the ceramics preform as the mold.

Also in this case, the mold is so mirror-finished mold that the mold can be more easily detachable after the pressure sintering, and the mold is neither cracked nor broken.

Preferably in the pressure-sintering step, the ceramics preform is pressure-sintered by employing a mold having the periphery constraint portion so inclined as to separate from the ceramics molded component with respect to a direction for unmolding the ceramics molded component as the mold.

Also in this case, the periphery constraint portion of the mold is so inclined as to separate from the ceramics molded component with respect to the direction for unmolding the ceramics molded component that the mold can be more easily detachable after the pressure sintering.

The mold according to the present invention is a mold for molding a premolded ceramics preform into a ceramics molded component of a prescribed shape by pressure-sintering the ceramics preform, comprising a lower mold section, an upper mold section, a periphery nonconstraint portion and a periphery constraint portion. The upper mold section is opposed to the lower mold section. The periphery nonconstraint portion is provided between the lower mold section and the upper mold section, and allows deformation of the ceramics preform in the peripheral direction. The periphery constraint portion is provided on at least either one of the upper mold section and the lower mold section, and regulates deformation of the ceramics preform in the peripheral direction for molding the periphery of the ceramics preform.

According to this structure, the mold is so provided with the periphery constraint portion that force of the ceramics preform going to spread in the radial direction due to the pressure sintering does not excessively act on the mold but the mold can be easily detached. Further, the mold can be so easily detached that the mold and the unmolded ceramics molded component can be prevented from damages such as cracking and chipping (improvement of detachability of the mold (improvement in unmoldability)).

Further, the periphery constraint portion prevents deformation in the peripheral direction and develops a lateral pressure necessary for the pressure sintering, whereby densification of the ceramics molded component for attaining a desired mechanical or optical function can be accomplished. In addition, the periphery nonconstraint portion is so provided that dispersion in weight etc. in the ceramics preform can be absorbed on the periphery nonconstraint portion without strictly controlling the weight, the volume, the thickness etc. of the ceramics preform in particular. Consequently, a plurality of ceramics molded components can be simultaneously molded, and productivity can be improved (improvement in productivity).

The ceramics preform is not further densified when prescribed densification is attained by pressurization, whereby the pressure can be constant-controlled. Thus, a ceramics molded component exhibiting desired optical functions etc. can be stably manufactured (stable densification).

The periphery constraint portion prevents deformation of the ceramics preform in the axial direction (direction perpendicular to the radial direction), thereby controlling the thickness of the ceramics preform. Further, the lateral pressure assisting the pressure sintering can be so developed that densification for attaining a desired mechanical or optical function, particularly the density of the ceramics preform in the vicinity of the periphery nonconstraint portion can be improved. A ceramics molded component having a desired central thickness can be precisely manufactured by optimizing the size, the weight and the volume of the ceramics preform, the length of the periphery constraint portion and the molding pressure (control of dimensional accuracy).

Preferably, the periphery constraint portion includes a lower periphery constraint portion formed on the lower mold section and an upper periphery constraint portion formed on the upper mold section, and assuming that a thickness $\alpha 1$ represents the length of the upper periphery constraint portion in a pressurization direction, a thickness $\alpha 2$ represents the length of the lower periphery constraint portion in the pressurization direction, a thickness $\alpha 3$ represents the length of the periphery nonconstraint portion in the pressurization direction and a thickness ratio $\beta$ represents the ratio $((\alpha 1+\alpha 2)/\alpha 3)$ of the thickness $(\alpha 1+\alpha 2)$ of the periphery constraint portion obtained by adding up the thickness $\alpha 1$ representing the length of the upper periphery constraint portion in the pressurization direction and the thickness $\alpha 2$ representing the length of the lower periphery constraint portion in the pressurization direction with respect to the thickness $(\alpha 3)$ of the periphery nonconstraint portion, the thickness ratio $\beta$ is set greater than zero.

Thus, the ceramics molded component has the periphery constraint portion, so that the aforementioned effects of improvement in unmoldability, improvement in productivity, stable densification and control of dimensional accuracy can be reliably attained.

On the other hand, the thickness ratio $\beta$ is preferably so set as not to exceed 100.

This is because such a tendency is recognized that the ratio occupied by the periphery constraint portion is increased and mold releasability is deteriorated if the thickness ratio $\beta$ is increased, while the mold may not be detachable if the thickness ratio exceeds 100.

Preferably, the periphery constraint portion includes a lower periphery constraint portion formed on the lower mold section and an upper periphery constraint portion formed on the upper mold section, and assuming that a height ratio $\gamma$ represents the ratio ($\alpha2/\alpha1$) of the thickness $\alpha2$ of the lower periphery constraint portion with respect to the thickness $\alpha1$ of the upper periphery constraint portion, the height ratio $\gamma$ is set greater than zero.

This is because such a tendency that the ceramics molded component sticks to the upper mold section was recognized when the height ratio $\gamma$ is zero, to an extent not problematic in practice.

Further, it is more preferable that the height ratio $\gamma$ is set to at least 1.

Thus, the ceramics molded component can be reliably prevented from sticking to the upper mold section.

The periphery constraint portion may be formed only on one of the lower mold section and the upper mold section.

Assuming that the thickness $\alpha1$ represents the length of the upper periphery constraint portion in the pressurization direction, the thickness $\alpha2$ represents the length of the lower periphery constraint portion in the pressurization direction and the thickness $\alpha3$ represents the length of the periphery nonconstraint portion in the pressurization direction in this case, the ratio of the thickness of the periphery constraint portion with respect to the thickness ($\alpha3$) of the periphery nonconstraint portion can be expressed in the thickness ratio $\beta$ ($=(\alpha1+\alpha2)/\alpha3$) similarly to the above, and the thickness ratio $\beta$ is preferably set greater than zero.

Thus, the ceramics molded component has the periphery constraint portion, so that the aforementioned effects of improvement in unmoldability, improvement in productivity, stable densification and control of dimensional accuracy can be reliably attained.

On the other hand, the thickness ratio $\beta$ is preferably so set as not to exceed 100.

This is because such a tendency is recognized that the ratio occupied by the periphery constraint portion is increased and mold releasability is deteriorated if the thickness ratio $\beta$ is increased, while the mold may not be detachable if the thickness ratio exceeds 100.

More specifically, the types of the mold include the following types:

In one of the types of the mold, the upper mold section includes an upper mold body, the lower mold section includes a lower mold body, and the periphery constraint portion is formed on at least either one of the upper mold body and the lower mold body. The upper mold body and the lower mold body denote mold sections substantially molding an optical surface, for example, in the ceramics molded component.

This type includes a type comprising a barrel mold cylindrically formed for receiving the lower mold body and the upper mold body.

The mold so comprises the barrel mold that axial accuracy of the upper mold body and the lower mold body can be improved, and axial accuracy and inclination accuracy of the ceramics molded component can be improved.

In the mold included in this type, the lower mold section includes a lower assembly mold section cylindrically formed for receiving the lower mold body, and the upper mold section includes an upper assembly mold section cylindrically formed for receiving the upper mold body.

In this case, the lower assembly mold section and the upper assembly mold section can also be assembled into the body of a ceramics molding apparatus. Thus, the lower mold body and the upper mold body mounted on the lower assembly mold section and the upper assembly mold section respectively can be rendered movable integrally with a pressure axis of the apparatus body, and the respective mold sections may not be assembled or dismantled (disassembled) but productivity is improved.

In another type of the mold, the lower mold section includes a cylindrically formed lower sleeve and a lower mold body inserted into the lower sleeve, the upper mold section includes a cylindrically formed upper sleeve and an upper mold body inserted into the upper sleeve, and the periphery constraint portion is formed on at least either the upper sleeve and the lower sleeve.

In this case, the periphery constraint portion is so formed on at least either the upper sleeve or the lower sleeve that the length of the periphery constraint portion can be changed by exchanging the lower sleeve or the upper sleeve in the first place, and the degree of freedom in design of the mold can be improved.

The degree of freedom in design of the mold capable of withstanding the lateral pressure in the pressure sintering can be improved by changing the sizes of the inner diameters and the outer diameters of the respective ones of the lower sleeve and the upper sleeve or changing the materials therefor.

While it follows that stress concentrates on a corner part around the periphery constraint portion when the ceramics preform is pressure-sintered, it follows that this stress acts on the lower mold (upper mold) body and the lower (upper) sleeve, and the mold can be prevented from breakage as compared with a case where such stress concentrates and acts only on one specific mold section.

Even if a specific mold section is broken, it may be sufficient to exchange only any one of the lower mold body, the lower sleeve, the upper mold body and the upper sleeve depending on the state of the breakage, and the mold may not be entirely exchanged but is excellent in economy.

The lower mold (upper mold) body and the lower (upper) sleeve are so made of materials having different thermal expansion coefficients that shrinkage of the ceramics preform in the pressure axis direction and shrinkage in the radial direction can be controlled, whereby the mold can be rendered more easily detachable after the pressure sintering, and it is possible to contribute to improvement in dimensional accuracy of the ceramics preform.

Still another type of the mold comprises a barrel mold cylindrically formed for receiving the lower mold section and the upper mold section.

In this case, the barrel mold is so employed that axial accuracy of the upper mold body and the lower mold body can be improved, and axial accuracy and inclination accuracy of the ceramics molded component can be improved.

In a further type of the mold, the lower mold section includes a lower assembly mold section cylindrically formed for receiving the lower sleeve, and the upper mold section includes an upper assembly mold section cylindrically formed for receiving the upper sleeve.

In this case, the lower assembly mold section and the upper assembly mold section can be assembled into the body of a ceramics molding apparatus. Thus, the lower mold body and the upper mold body mounted on the lower assembly mold section and the upper assembly mold section respectively can be rendered movable integrally with a pressure axis of the apparatus body, and the respective mold sections may not be assembled or dismantled (disassembled) but the productivity is improved.

Further, the lower mold body and the upper mold body can move integrally with the pressure axis of the apparatus body, whereby the ceramics preform can be easily automatically placed on the lower mold body or the mold can be easily automatically detached after the pressure sintering, and the productivity is improved.

In addition, dispersion in assembling (assembly) of the respective mold sections is so eliminated that dispersion in pressure sintering conditions such as the temperature and the pressure resulting from this dispersion is reduced and reproducibility of the pressure sintering conditions can be improved.

A further type of the mold further comprises a cylindrical sleeve cylindrically formed for receiving the lower mold section and the upper mold section.

In this case, the cylindrical sleeve is so provided that it follows that the ceramics preform is not directly heated but heated (indirectly heated) through the cylindrical sleeve when subjected to the pressure sintering. Thus, a soaking property in the mold can be improved.

Further, it follows that the cylindrical sleeve, the upper assembly mold section and the lower assembly mold section form a closed space. Thus, part of the ceramics preform can be inhibited from sublimating, vaporizing or evaporating when the ceramics preform is pressure-sintered, and weight reduction before and after the pressure sintering can be prevented.

In addition, the upper mold body and the lower mold body are preferably rendered movable in a pressure axis direction through a prescribed movable clearance.

In this case, abrupt pressure increase resulting from the rigid mold coming into contact with the ceramics preform can be prevented when the pressurization is started. Further, the upper mold body and the lower mold body can so move when the pressurization is started that the ceramics preform is located on a most stable position of the mold and displacement caused when the ceramics preform is set on the mold can be absorbed. In addition, dispersion in simplex weight, thickness and inclination of the ceramics preform can be absorbed through the movable clearance in pressurization.

In a further type of the mold, the lower mold section includes a cylindrically formed lower assembly mold section and a lower mold body inserted into the lower assembly mold section, the upper mold section includes a cylindrically formed upper assembly mold section and an upper mold body inserted into the upper assembly mold section, and the periphery constraint portion is formed on at least either one of the lower assembly mold section and the upper assembly mold section.

In this case, the periphery constraint portion is so formed on the lower assembly mold section or the upper assembly mold section that an effect capable of improving the degree of freedom in design of the ceramics preform, an effect capable of preventing the mold from breakage, an effect of economy and an effect of improving the dimensional accuracy of the ceramics preform can be attained similarly to the case of forming the periphery constraint portion on the lower sleeve or the upper sleeve.

Preferably in the mold, the periphery constraint portion includes an upper periphery constraint portion formed on the upper mold section and a lower periphery constraint portion formed on the lower mold section, a part located between the upper periphery constraint portion and the periphery nonconstraint portion and another part located on a side opposite to the side provided with the periphery nonconstraint portion from the upper periphery constraint portion are chamfered respectively in the upper mold section, and a part located between the lower periphery constraint portion and the periphery nonconstraint portion and another part located on a side opposite to the side provided with the periphery noncon-straint portion from the lower periphery constraint portion are chamfered respectively in the lower mold section.

In this case, chamfering is so performed that the mold can be rendered more easily detachable after the pressure sintering, and breakage of the mold as well as cracking or chipping of the ceramics molded component can be prevented.

Preferably, a part located between the periphery constraint portion and the periphery nonconstraint portion and another part located on a side opposite to the side provided with the periphery nonconstraint portion from the periphery constraint portion are chamfered respectively in either one of the upper mold section and the lower mold section provided with the periphery constraint portion.

Also in this case, chamfering is so performed that the mold can be rendered more easily detachable after the pressure sintering, and breakage of the mold as well as cracking or chipping of the ceramics molded component can be prevented.

Preferably, the periphery constraint portion includes an upper periphery constraint portion formed on the upper mold section and a lower periphery constraint portion formed on the lower mold section, the upper periphery constraint portion is so inclined as to gradually spread outward over a part located on a side opposite to the side provided with the periphery nonconstraint portion in the upper periphery constraint portion and another part located on the side of the periphery nonconstraint portion, and the lower periphery constraint portion is so inclined as to gradually spread outward over a part located on a side opposite to the side provided with the periphery nonconstraint portion in the lower periphery constraint portion and another part located on the side of the periphery nonconstraint portion.

Also in this case, prescribed inclination is so provided that the mold can be rendered more easily detachable after the pressure sintering, and breakage of the mold as well as cracking or chipping of the ceramics molded component can be prevented.

Preferably, either one of the upper mold section and the lower mold section provided with the periphery constraint portion is so inclined as to gradually spread outward over a part located on a side opposite to the side provided with the periphery nonconstraint portion in the periphery constraint portion and another part located on the side of the periphery nonconstraint portion.

Also in this case, prescribed inclination is so provided that the mold can be rendered more easily detachable after the pressure sintering, and breakage of the mold as well as cracking or chipping of the ceramics molded component can be prevented.

Preferably, portions molding the prescribed shape of the ceramics molded component are mirror-finished in the lower mold section and the upper mold section.

Also in this case, mirror finishing is so performed that the mold can be rendered more easily detachable after the pressure sintering, and breakage of the mold as well as cracking or chipping of the ceramics molded component can be prevented.

Preferably, the coefficient of kinetic friction between materials employed for sliding portions is set to not more than 0.6 in the lower mold section and the upper mold section of the mold.

In this case, molding of the ceramics molded component can be prevented from inhibition resulting from hang-up between the members constituting the mold. Further, the ceramics preform or the ceramics molded component can be prevented from cracking or chipping by suppressing cracking of the respective members and inhibiting local stress from acting on the ceramics preform.

More specifically, combinations of the barrel mold and the upper (lower) mold body, the barrel mold and the upper (lower) sleeve, the upper (lower) mold body and the upper (lower) sleeve, an upper (lower) press sleeve and the upper (lower) mold body and the cylindrical sleeve and the upper (lower) assembly mold section are listed as those of the portions sliding in the mold. Further, sliding between the ceramics preform and the upper (lower) mold section is also included in this specification.

Preferably, the lower mold section and the upper mold section include portions made of a material having a thermal expansion coefficient less than the thermal expansion coefficient of the ceramics molded component.

In this case, the ceramics molded component can be prevented from cracking or chipping caused by the mold clamping the ceramics molded component and the mold can be rendered easily detachable when the ceramics molded component and the like are cooled after heating/sintering.

Preferably, the thermal conductivity of the lower mold section and the upper mold section is set to at least 3 W/mK.

In this case, the rate of temperature rise in the pressure sintering and the cooling rate after the pressure sintering can be increased, and the soaking property can be improved.

Preferably, the lower mold section and the upper mold section of the mold are made of any one of a ceramics material, a metallic material, a carbon-based material and a composite material of these materials.

Thus, the aforementioned effect of the detachability of the mold and the effect of preventing cracking and chipping of the ceramics molded component can be attained.

Preferably, the ceramics material contains a carbide, a nitride and a carbonitride each containing at least any element selected from a group consisting of silicon (Si), aluminum (Al), titanium (Ti), zirconium (Zr), hafnium (Hf), tungsten (W), molybdenum (Mo) and chromium (Cr) by at least 70 weight % of the overall said ceramics material.

This is because no sufficient effect can be attained if the weight is lower than 70 weight %.

Preferably, the metallic material includes any material selected from a group consisting of gold (Au), platinum (Pt), palladium (Pd), iridium (Ir), molybdenum (Mo), tungsten (W), a nickel (Ni)-based heat-resistant alloy and an iron (Fe) heat-resistant alloy.

Preferably, the carbon-based material includes any material selected from a group consisting of graphite, glassy carbon, a fiber-reinforced carbon composite material, diamondlike carbon and diamond.

Preferably, the carbon-based material includes a material having any material selected from a group consisting of graphite, glassy carbon, a fiber-reinforced carbon composite material, diamondlike carbon and diamond or pyrolytic carbon at least on the surface thereof.

In this case, in particular, the pyrolytic carbon and the like are so formed on the surface that the carbon matrix can be prevented from mixing into the mold, and impurities can be suppressed.

Preferably, the composite material includes non-oxide ceramics containing the carbon-based material.

The carbon-based material may include at least any material selected from a group consisting of graphite, glassy carbon, carbon nanotube, fullerene, carbon fiber and diamond.

Further, the composite material may include porous ceramics having a carbonaceous coat on the surface thereof.

More specifically, the carbonaceous coat preferably contains at least any material selected from a group consisting of glassy carbon, pyrolytic carbon, diamondlike carbon and diamond.

Preferably, the melting point, the glass transition point or the sublimation point of the lower mold section and the upper mold section is in excess of a sintering temperature for sintering the ceramics molded component in the mold, and the bending strength of the lower mold section and the upper mold section at the sintering temperature is set in excess of the molding pressure.

Thus, durability can be improved by preventing the mold from cracking, chipping, deformation and welding to the ceramics molded component in the pressure sintering.

The ceramics component according to the present invention is a solid ceramics component having a prescribed outer shape, while the density of a portion located on a prescribed region along the periphery is lower than the density of another portion located at the center.

According to this structure, the portion located on the prescribed region of the ceramics component along the peripheral direction can be more easily worked as compared with the remaining portion.

In particular, this ceramics component is preferably formed by pressure-molding a ceramics preform with a mold comprising an upper mold section and a lower mold section opposed to each other, a periphery nonconstraint portion provided between the lower mold section and the upper mold section for allowing deformation of the ceramics preform in the peripheral direction and a periphery constraint portion formed on at least either one of the upper mold section and the lower mold section for regulating deformation of the ceramics preform in the peripheral direction for molding the periphery of the ceramics preform, while it follows that the portion located on the prescribed region along the periphery corresponds to a peripheral portion having been located on the periphery nonconstraint portion, and the portion located at the center corresponds to a central portion having been located at the center between the upper mold section and the lower mold section.

In particular, the density of the peripheral portion is preferably set to at least 95% of the density of the central portion.

While optical materials such as ZnS (zinc sulfide), ZnSe (zinc selenide), Ge (germanium), Si (silicon), $BaF_2$ (barium fluoride), $CaF_2$ (calcium fluoride) and $MgAl_2O_4$ (spinel) can be listed as ceramics, the ceramics component according to the present invention is not restricted to such materials.

BRIEF DESCRIPTION OF THE DRAWINGS

FIG. 19 is a diagram showing results of evaluation in a case of performing chamfering etc. on ceramics molded components in the ninth embodiment.

FIG. 23 is a diagram showing results of evaluation in a case of providing draft angles on ceramics molded components in the eleventh embodiment.

FIG. 24 is a diagram showing results of evaluating the relations between the thicknesses etc. of periphery constraint portions of molds according to a twelfth embodiment of the present invention and ceramics molded components.

FIG. 26 is a diagram showing results of evaluating the relations between thickness ratios etc. of molds and ceramics molded components in the thirteenth embodiment.

FIG. 27 is a diagram showing results of evaluating materials for molds according to a fourteenth embodiment of the present invention and detachability of the molds.

FIG. 28 is a diagram showing results of evaluating the relations between materials for molds according to a fifteenth embodiment of the present invention and slidability.

FIG. 29 is a diagram showing results of evaluating the relations between the thermal expansion coefficients of ceramics preforms and molds according to a sixteenth embodiment of the present invention.

FIG. 31 is a diagram showing results of evaluating the melting points, bending strength etc. of molds according to an eighteenth embodiment of the present invention.

DESCRIPTION OF THE REFERENCE SIGNS

1 mold, 2 lower mold section, 3 lower mold body, 3a optical molding surface, 4 lower sleeve, 5 lower assembly mold section, 6 lower spacer, 8 upper mold section, 9 upper mold body, 9a optical molding surface, 10 upper sleeve, 11 upper assembly mold section, 12 upper spacer, 13 barrel mold, 14 cylindrical sleeve, 15 lower periphery constraint portion, 16 upper periphery constraint portion, 17 periphery nonconstraint portion, 18 lower press sleeve, 19 upper press sleeve, 21 ceramics preform, 22 ceramics molded component, 22a protruding part, 23 lens, 23a biconvex lens, 23b planar lens, 23c plano-convex lens, 23d meniscus lens, 23e biconcave lens, 23f diffraction lens.

BEST MODES FOR CARRYING OUT THE INVENTION

First Embodiment

Figure 1:
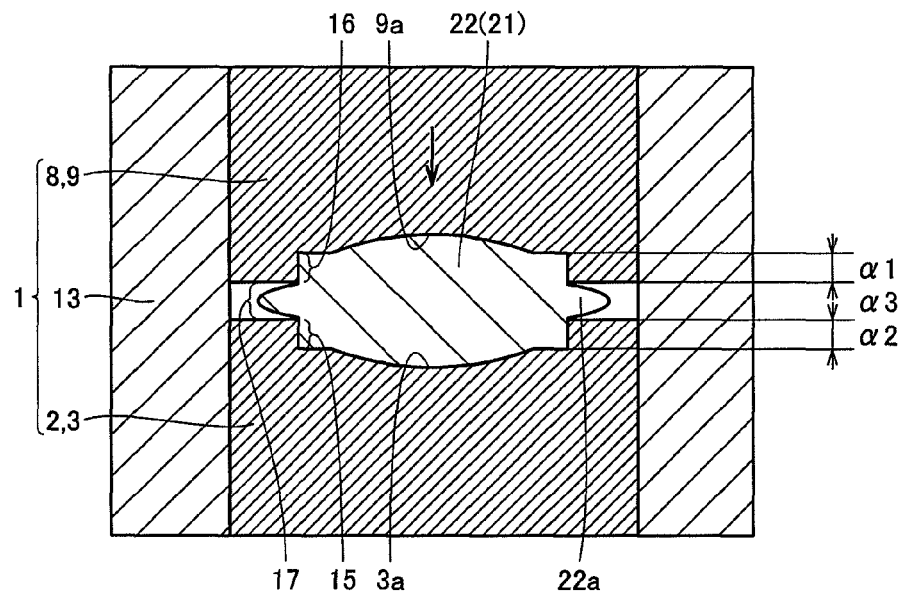
FIG. 1 is a sectional view of a mold according to a first embodiment of the present invention.

A first embodiment is described with reference to a mold for manufacturing a biconvex lens and a method of manufacturing a lens with a ceramics molded component. As shown in FIG. 1, a mold 1 is constituted of a cylindrical barrel mold 13, as well as a lower mold body 3 and an upper mold body 9 slidably inserted into barrel mold 13 respectively. Lower mold body 3 and upper mold body 9 are made of glassy carbon (GC), for example. Barrel mold 13 is made of graphite, for example. Lower mold body 3 constitutes a lower mold section 2, and upper mold body 9 constitutes an upper mold section 8.

Lower mold section 3 is provided with a lower periphery constraint portion 15 for molding a peripheral portion of the lens and a mirror-finished optical molding surface 3a for molding an optical surface of the lens. Upper mold body 9 is also provided with an upper periphery constraint portion 16 for molding a peripheral portion of the lens and a mirror-finished optical molding surface 9a for molding the optical surface of the lens. Upper periphery constraint portion 16 is so formed as to have a prescribed length (thickness) α1 in a pressure axis direction (insertion direction), and lower periphery constraint portion 15 is also so formed as to have a prescribed length (thickness) α2 in the pressure axis direction. In this mold 1, further, a periphery nonconstraint portion 17 not constraining ceramics when molding a ceramics preform is provided between lower mold body 3 and upper mold body 9. This periphery nonconstraint portion 17 is so set as to have a prescribed thickness α3.

A method of manufacturing a lens with the aforementioned mold 1 is now described. First, the ceramics preform is formed by preparing ZnS powder having purity of 99.7% and an average particle diameter of 2 μm as raw material powder and pressurizing this ZnS powder by biaxial cold press molding under a pressure of about 98 MPa.

Figure 2:
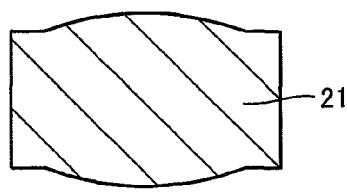
FIG. 2 is a sectional view showing one step in a method of manufacturing a ceramics molded component according to the first embodiment.

Then, presintered ceramics preform 21 having dimensions of 8 mm (φ)×8 mm (thickness), a tanju of about 0.95 grams and relative density of about 60% is formed as shown in FIG. 2 by presintering the ceramics preform in a vacuum furnace under a temperature of about 700° C. for about 5 hours, for example. The tanju denotes the simplex weight. The relative density denotes the ratio (actual density/theoretical density) of the actual density to the theoretical density.

The relative density of the ceramics preform may be at such a level that the ceramics preform can be further deformed in a subsequent final pressure-sintering step, and is preferably set to at least 55% and not more than 99%, for example. The presintering may be performed under the atmospheric pressure, for example, in place of the vacuum furnace, or may be performed by pressure sintering such as hot pressing in the mold.

Figure 3:
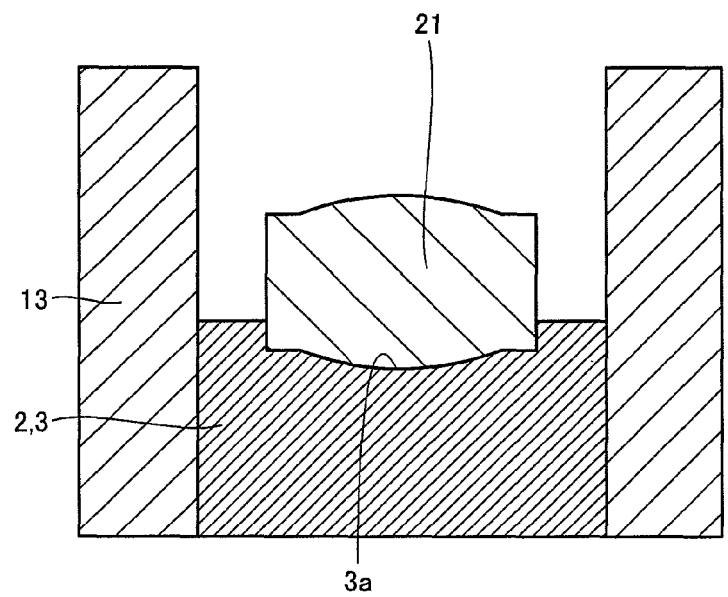
FIG. 3 is a sectional view showing a step carried out subsequently to the step shown in FIG. 2 in the first embodiment.
Figure 4:
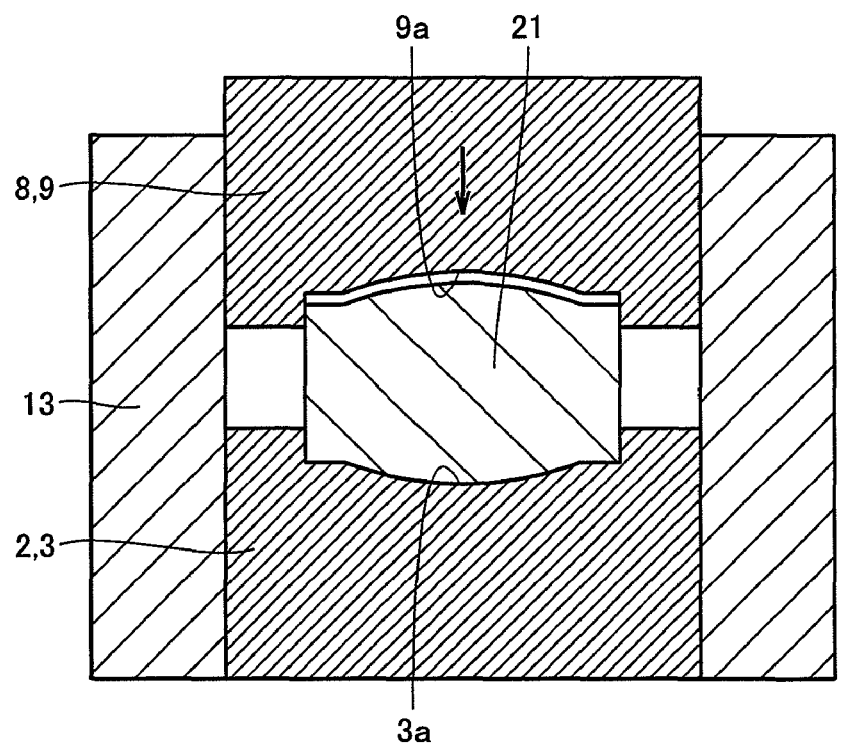
FIG. 4 is a sectional view showing a step carried out subsequently to the step shown in FIG. 3 in the first embodiment.

Then, ceramics preform 21 is placed on lower mold body 3 of mold 1 for final molding, as shown in FIG. 3. Then, upper mold body 9 is inserted into barrel mold 13 from above, for holding ceramics preform 21 between upper mold body 9 and lower mold body 3, as shown in FIG. 4. Then, the temperature is increased in a vacuum for starting pressurization of ceramics preform 21 when the temperature reaches about 850° C., the temperature is further increased to reach about 950° C., and when the pressure reaches 50 MPa, this state is maintained for about 3 minutes (pressure sintering condition A).

Thus, while ceramics preform 21 is going to spread in the radial direction, ceramics preform 21 is inhibited from going to spread in lower periphery constraint portion 15 and upper periphery constraint portion 16 and it follows that a portion corresponding to the periphery of the lens is molded, as shown in FIG. 1. In periphery constraint portion 17, on the other hand, it follows that ceramics preform 21 is not constrained but spreads in the radial direction to form a protruding part 22a.

While it follows that ceramics preform 21 is densified and deformed by pressurization, the densification does not further progress but the deformation of ceramics preform 21 stops when prescribed densification is attained as to portions in lower periphery constraint portion 15 and upper periphery constraint portion 16 substantially constituting the lens. Thus, it follows that upper mold body 9 does not gradually approach lower mold body 3 along with pressurization but the interval of periphery nonconstraint portion 17 is held.

Figure 5:
FIG. 5 is a sectional view showing a step carried out subsequently to the step shown in FIG. 4 in the first embodiment.
Figure 6:
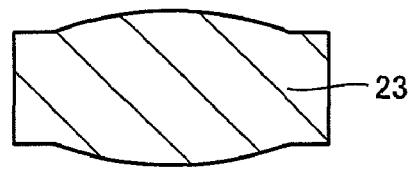
FIG. 6 is a sectional view showing a step carried out subsequently to the step shown in FIG. 5 in the first embodiment.

Then, upper mold body 9 is detached and a pressure-sintered ceramics molded component is taken out from mold 1. In an umolded ceramics molded component 22, protruding part 22a located on periphery nonconstraint portion 17 of mold 1 to radially protrude is formed along the periphery, as shown in FIG. 5. Then, protruding part 22a remaining on the periphery of ceramics molded component 22 is removed. Thus, a lens 23 of a prescribed shape is completed, as shown in FIG. 6.

When lens 23 manufactured by this method was evaluated, the thickness t (see FIG. 25) of a central portion was 4.0 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, mold 1 is so provided with periphery nonconstraint portion 17 as to attain the following effects: First, periphery nonconstraint portion 17 is so provided that force of the ceramics preform going to spread in the radial direction due to the pressure sintering does not excessively act on mold 1 but upper mold body 9 etc. can be easily detached. Further, the mold can be so easily detached that mold 1 and unmolded ceramics molded component 22 for forming the lens can be prevented from damages such as cracking and chipping (improvement of detachability of the mold (improvement in unmoldability)).

Further, lower periphery constraint portion 15 and upper periphery constraint portion 16 prevent deformation in the peripheral direction and develop a lateral pressure necessary for the pressure sintering, whereby densification of ceramics molded component 22 for attaining a desired mechanical or optical function etc. can be achieved. In addition, periphery nonconstraint portion 17 is so provided that dispersion in weight etc. in ceramics preform 21 can be absorbed on periphery nonconstraint portion 17 without strictly controlling the weight, the volume, the thickness etc. of ceramics preform 21 in particular. Consequently, a plurality of ceramics molded components 22 can be simultaneously molded, and productivity can be improved (improvement in productivity).

Further, ceramics preform 21 is not further densified when prescribed densification is attained by pressurization, whereby the pressure can be constant-controlled. Thus, ceramics molded component 22 exhibiting desired optical functions etc. can be stably manufactured (stable densification).

Further, lower periphery constraint portion 15 and upper periphery constraint portion 16 prevent ceramics preform 21 from deformation in the pressure axis direction (direction perpendicular to the radial direction), thereby controlling the thickness t of ceramics preform 22. In addition, the lateral pressure assisting the pressure sintering can be so developed that densification for attaining a desired mechanical or optical function, particularly the density of ceramics preform 21 in the vicinity of periphery nonconstraint portion 17 can be improved. Ceramics molded component 22 having a desired central thickness t can be precisely manufactured by optimizing the size, the weight and the volume of ceramics preform 21, the length of lower periphery constraint portion 15, the length of upper periphery constraint portion 16 and the molding pressure (control of dimensional accuracy).

Second Embodiment

A second embodiment is described with reference to another mold for manufacturing a biconvex lens.

Figure 7:
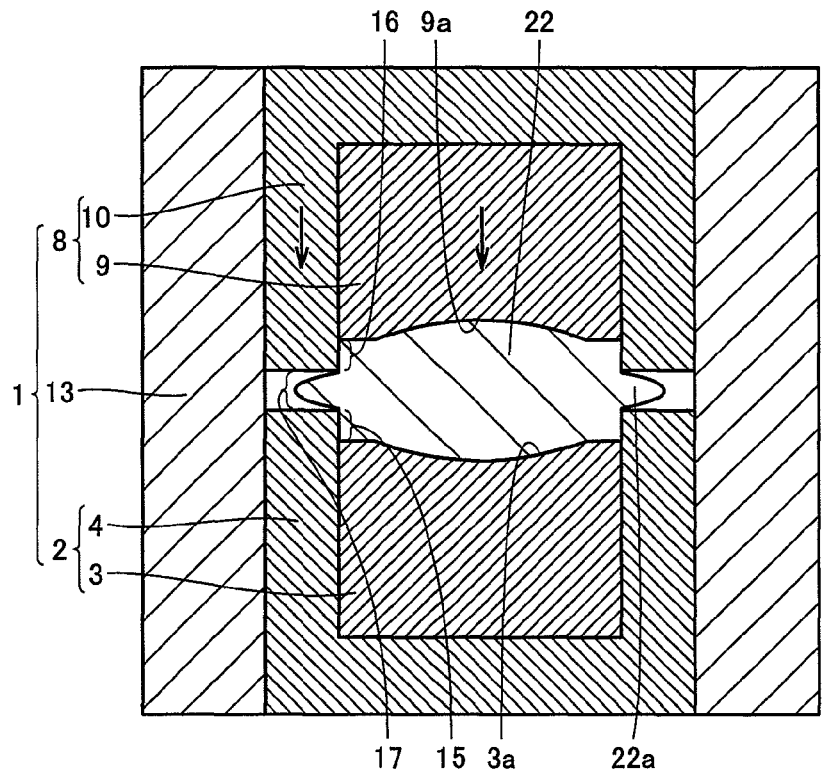
FIG. 7 is a sectional view of a mold according to a second embodiment of the present invention.

As shown in FIG. 7, a mold 1 is constituted of a cylindrical barrel mold 13 as well as a lower mold body 3 and a lower sleeve 4 and an upper mold body 9 and an upper sleeve 10 slidably inserted into barrel mold 13 respectively. Lower mold body 3, lower sleeve 4, upper mold body 9 and upper sleeve 10 are made of graphite, for example. Barrel mold 13 is made of graphite, for example.

Lower mold body 3 and upper mold body 9 are provided with mirror-finished optical molding surfaces 3a and 9a for molding an optical surface of the lens respectively. Lower sleeve 4 constitutes a lower periphery constraint portion 15 for molding a peripheral portion of the lens, and upper sleeve 10 constitutes an upper periphery constraint portion 16 for molding the peripheral portion of the lens. Both of the length α1 of upper periphery constraint portion 16 and the length α2 of lower periphery constraint portion 15 are set to 0.5 mm. A periphery nonconstraint portion 17 not constraining ceramics when molding a ceramics molded component is provided between lower sleeve 4 and upper sleeve 10.

A method of manufacturing a lens with the aforementioned mold 1 is now described. First, a presintered ceramics preform having dimensions of 8 mm (φ)×6.6 mm (thickness), a simplex weight of about 0.7 grams and relative density of about 60% is formed by molding a ceramics preform from ZnS powder and presintering this ceramics preform by a method similar to the aforementioned method of manufacturing a lens.

Then, the ceramics preform is placed on lower mold body 3 of mold 1, and upper mold body 9 and upper sleeve 10 are inserted into barrel mold 13 from above, for holding the ceramics preform between upper mold body 9 and upper sleeve 10 and lower mold body 3 and lower sleeve 4. Then, a ceramics molded component 22 for forming the lens is molded by sintering and pressurizing the ceramics preform by a method similar to the aforementioned method of manufacturing a lens, as shown in FIG. 7. Thereafter ceramics molded component 22 is taken out from mold 1, and a lens similar to lens 23 shown in FIG. 6 is formed by removing a radially protruding part 22a remaining on the periphery of ceramics molded component 22.

When lens 23 manufactured by this method was evaluated, the thickness t of a central portion was 3.24 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, the following effects are attained in addition to the aforementioned effects of improvement in unmoldability, improvement in productivity, stable densification and control of dimensional accuracy: In this mold 1, lower periphery constraint portion 15 is constituted of lower sleeve 4, and upper periphery constraint portion 16 is constituted of upper sleeve 10. Therefore, the lengths of the respective ones of lower periphery constraint portion 15 and upper periphery constraint portion 16 can be changed by exchanging lower sleeve 4 or upper sleeve 10, and the degree of freedom in design of mold 1 can be improved.

Further, the degree of freedom in design of mold 1 capable of withstanding the lateral pressure in the pressure sintering can be increased by changing the sizes of the inner diameters and the outer diameters of the respective ones of lower sleeve 4 and upper sleeve 10 or changing the materials therefor.

In addition, while it follows that stress concentrates on a corner part from lower (upper) periphery constraint portion 15 or 16 to optical molding surface 3a or 9a when the ceramics preform is pressure-sintered, it follows that this stress acts on lower mold (upper mold) body 3 or 9 and lower (upper) sleeve 4 or 10, and breakage of the mold can be prevented as compared with a case where such stress concentrates and acts only on one specific mold section.

Even if a specific mold section is broken, it may be sufficient to exchange only any one of lower mold body 3, lower sleeve 4, upper mold body 9 and upper sleeve 10 depending on the state of the breakage, and mold 1 may not be entirely exchanged but is excellent in economy.

Lower mold (upper mold) body 3 or 9 and lower (upper) sleeve 4 or 10 are so made of materials having different thermal expansion coefficients that shrinkage of the ceramics preform in the pressure axis direction and shrinkage in the radial direction can be controlled, whereby the mold can be rendered more easily detachable after the pressure sintering, and it is possible to contribute to improvement in dimensional accuracy of the ceramics preform.

Third Embodiment

Figure 8:
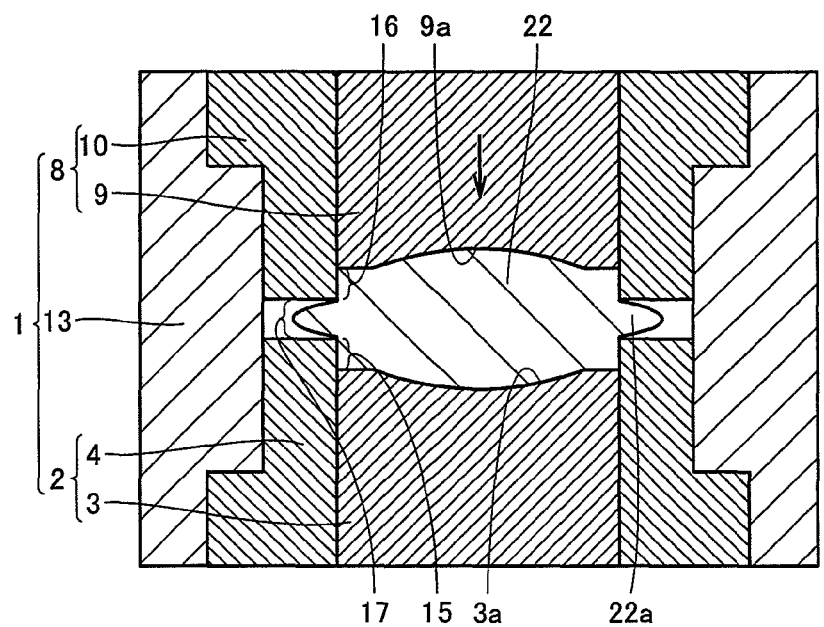
FIG. 8 is a sectional view of a mold according to a third embodiment of the present invention.

A third embodiment is described with reference to still another mold for manufacturing a biconvex lens. As shown in FIG. 8, a mold 1 is constituted of a cylindrical barrel mold 13 as well as a lower mold body 3 and a lower sleeve 4 and an upper mold body 9 and an upper sleeve 10 slidably inserted into barrel mold 13 respectively. Lower sleeve 4 and upper sleeve 10 are so mounted on barrel mold 13 as not to be movable during molding. Lower mold body 3, lower sleeve 4, upper mold body 9 and upper sleeve 10 are made of GC, for example. Barrel mold 13 is made of SiC, for example.

Lower mold body 3 and upper mold body 9 are provided with mirror-finished optical molding surfaces 3a and 9a for molding an optical surface of the lens respectively. Lower sleeve 4 constitutes a lower periphery constraint portion 15 for molding a peripheral portion of the lens, and upper sleeve 10 constitutes an upper periphery constraint portion 16 for molding the peripheral portion of the lens. Both of the length α1 of the upper periphery constraint portion and the length α2 of the lower periphery constraint portion are set to 1.0 mm. A periphery nonconstraint portion 17 not constraining ceramics when molding a ceramics preform is provided between lower sleeve 4 and upper sleeve 10.

A method of manufacturing a lens with the aforementioned mold is now described. First, a presintered ceramics preform is formed by molding a ceramics preform from ZnS powder and presintering the same by a method similar to the aforementioned method of manufacturing a lens.

Then, the ceramics preform is placed on lower mold body 3 of mold 1, and upper mold body 9 and upper sleeve 10 are inserted into barrel mold 13 from above, for holding the ceramics preform between upper mold body 9 and upper sleeve 10 and lower mold body 3 and lower sleeve 4. Then, a ceramics molded component 22 for forming the lens is molded by sintering and pressurizing the ceramics preform by a method similar to the aforementioned method of manufacturing a lens, as shown in FIG. 8. Thereafter ceramics molded component 22 is taken out from mold 1, and a lens similar to lens 23 shown in FIG. 6 is formed by removing a radially protruding part 22a remaining on the periphery of ceramics molded component 22.

When the lens manufactured by this method was evaluated, the thickness t of a central portion was 4.1 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, an effect capable of improving the degree of freedom in design of the mold with the provision of the aforementioned lower sleeve and upper sleeve, an effect of suppressing breakage of the mold, an effect of economy and an effect of control of the dimensional accuracy of a ceramics sintered body are attained in addition to the already described effects of improvement in unmoldability, improvement in productivity, stable densification and control of the dimensional accuracy. Further, the axial accuracy of the upper mold section and the lower mold section can be improved by employing the barrel mold, so that the axial accuracy and inclination accuracy of the ceramics molded component can be improved.

Fourth Embodiment

Figure 9:
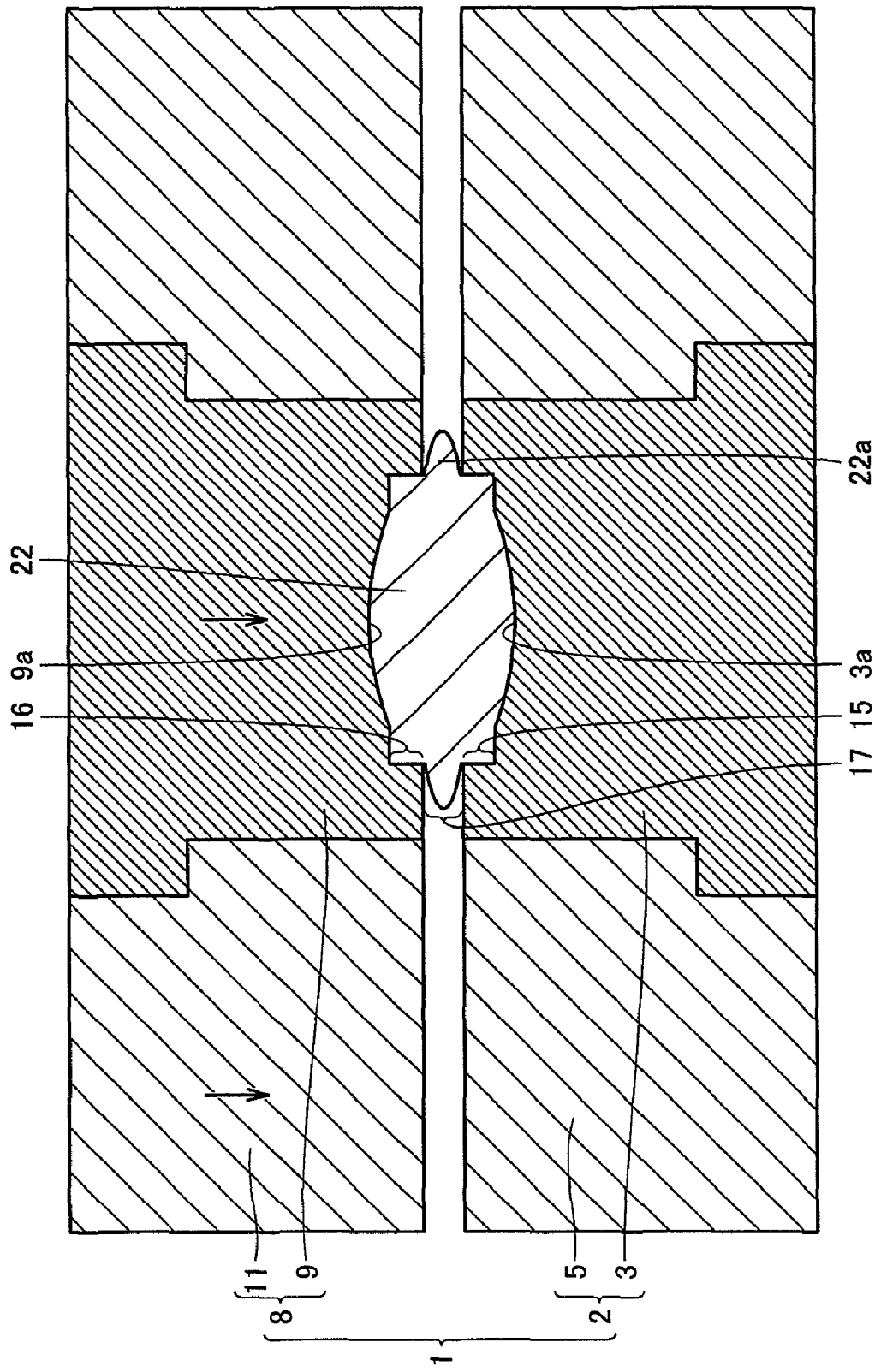
FIG. 9 is a sectional view of a mold according to a fourth embodiment of the present invention.

A fourth embodiment is described with reference to a further mold for manufacturing a biconvex lens. As shown in FIG. 9, a mold 1 is constituted of a cylindrical lower assembly mold section 5 and a lower mold body 3 mounted on lower assembly mold section 5 as well as a cylindrical upper assembly mold section 11 and an upper mold body 9 mounted on upper assembly mold section 11. Lower assembly mold section 5 and upper assembly mold section 11 may be assembled into a body portion (not shown) of a ceramics molding apparatus. Lower mold body 3 and upper mold body 9 are made of GC, for example. Lower assembly mold section 5 and upper assembly mold section 11 are made of cemented carbide, for example.

Lower mold body 3 is provided with a lower periphery constraint portion 15 for molding a peripheral portion of the lens and a mirror-finished optical molding surface 3a for molding an optical surface of the lens. Upper mold body 9 is also provided with an upper periphery constraint portion 16 for molding the peripheral portion of the lens and a mirror-finished optical molding surface 9a for molding the optical surface of the lens. Both of the length $\alpha1$ of the upper periphery constraint portion and the length $\alpha2$ of the lower periphery constraint portion are set to 0.75 mm. A periphery nonconstraint portion 17 not constraining ceramics when molding a ceramics preform is provided between lower mold body 3 and upper mold body 9.

A method of manufacturing a lens with the aforementioned mold is now described. First, a presintered ceramics preform is formed by molding a ceramics preform from ZnS powder and presintering the same by a method similar to the aforementioned method of manufacturing a lens.

Then, the ceramics preform is placed on lower mold body 3 of mold 1, and upper mold body 9 and upper assembly mold section 11 are lowered from above, for holding the ceramics preform between upper mold body 9 and upper assembly mold section 11 and lower mold body 3 and lower assembly mold section 5. Then, a ceramics molded component 22 for forming the lens is molded by sintering and pressurizing the ceramics preform by a method similar to the aforementioned method of manufacturing a lens, as shown in FIG. 9. Thereafter ceramics molded component 22 is taken out from mold 1, and a lens similar to lens 23 shown in FIG. 6 is formed by removing a radially protruding part 22a remaining on the periphery of ceramics molded component 22.

When the lens manufactured by this method was evaluated, the thickness t of a central portion was 4.0 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, the following effects are attained in addition to the already described effects of improvement in unmoldability, improvement in productivity, stable densification and control of dimensional accuracy: Mold 11 so comprises lower assembly mold section 5 and upper assembly mold section 11 assembled into the apparatus body of the ceramics molding apparatus that lower mold body 5 and upper mold body 11 mounted on these sections respectively can be rendered movable integrally with a pressure axis of the apparatus body, and the respective mold sections may not be assembled or dismantled (disassembled) but productivity is improved.

Further, lower mold body 3 and upper mold body 9 can move integrally with the pressure axis of the apparatus body, whereby the ceramics preform can be easily automatically placed on lower mold body 3 or the mold can be easily automatically detached after the pressure sintering, and the productivity is improved.

In addition, dispersion in assembling (assembly) of the respective mold sections is so eliminated that dispersion in pressure sintering conditions such as the temperature and the pressure resulting from this dispersion is reduced and reproducibility of the pressure sintering conditions can be improved.

Fifth Embodiment

Figure 10:
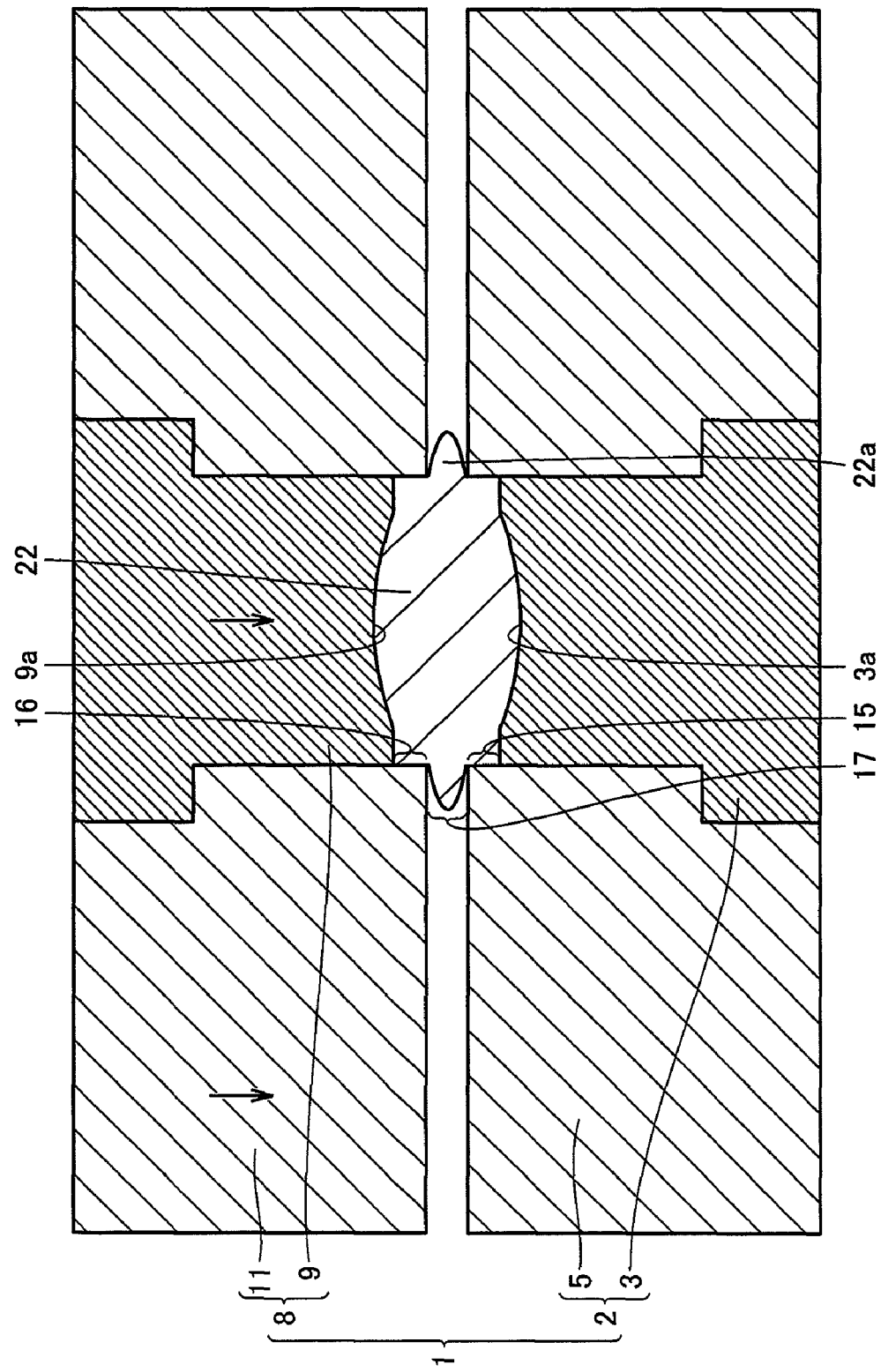
FIG. 10 is a sectional view of a mold according to a fifth embodiment of the present invention.

A fifth embodiment is described with reference to a further mold for manufacturing a biconvex lens. As shown in FIG. 10, a mold 1 is constituted of a cylindrical lower assembly mold section 5 and a lower mold body 3 mounted on lower assembly mold section 5 as well as a cylindrical upper assembly mold section 11 and an upper mold body 9 mounted on upper assembly mold section 11, and lower assembly mold section 5 and upper assembly mold section 11 are assembled into a body portion (not shown) of a ceramics molding apparatus. Lower mold body 3 and upper mold body 9 are made of GC, for example. Lower assembly mold section 5 and upper assembly mold section 11 are made of graphite, for example.

Lower mold body 3 is provided with a mirror-finished optical molding surface 3a for molding an optical surface of the lens. Upper mold body 9 is also provided with a mirror-finished optical molding surface 9a for molding the optical surface of the lens. Lower assembly mold section 5 constitutes a lower periphery constraint portion 15 for molding a peripheral portion of the lens, and upper assembly mold section 11 constitutes an upper periphery constraint portion 16 for molding the peripheral portion of the lens. Both of the length $\alpha1$ of upper periphery constraint portion 16 and the length $\alpha2$ of lower periphery constraint portion 15 are set to 0.75 mm. A periphery nonconstraint portion 17 not constraining ceramics when molding a ceramics preform is provided between lower assembly mold section 5 and upper assembly mold section 11.

A method of manufacturing a lens with the aforementioned mold 1 is now described. First, a presintered ceramics preform is formed by molding a ceramics preform from ZnS powder and presintering the same by a method similar to the aforementioned method of manufacturing a lens.

Then, the ceramics preform is placed on lower mold body 3 of mold 1, and upper mold body 9 and upper assembly mold section 11 are lowered from above, for holding the ceramics preform between upper mold body 9 and upper assembly mold section 11 and lower mold body 3 and lower assembly mold section 5. Then, a ceramics molded component 22 for forming the lens is molded by sintering and pressurizing the ceramics preform by a method similar to the aforementioned method of manufacturing a lens, as shown in FIG. 10. Thereafter ceramics molded component 22 is taken out from mold 1, and a lens similar to lens 23 shown in FIG. 6 is formed by removing a radially protruding part 22a remaining on the periphery of ceramics molded component 22.

When the lens manufactured by this method was evaluated, the thickness t of a central portion was 4.0 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, an effect of improvement in productivity and an effect of improvement in reproducibility of pressure sintering conditions can be attained due to the provision of the lower assembly mold section and the upper assembly mold section assembled into the apparatus body of the ceramic molding apparatus as described above, in addition to the already described effects of improvement in unmoldability, improvement in productivity, stable densification and control of dimensional accuracy.

Stress at the time of pressure-sintering the ceramics preform acts on lower mold body 3 and lower assembly mold section 5 in a lower mold section 2 and acts on upper mold body 9 and upper assembly mold section 11 in an upper mold section 8, whereby stress can be prevented from concentrating on only a specific mold section, and the mold can be prevented from breakage.

Sixth Embodiment

Figure 11:
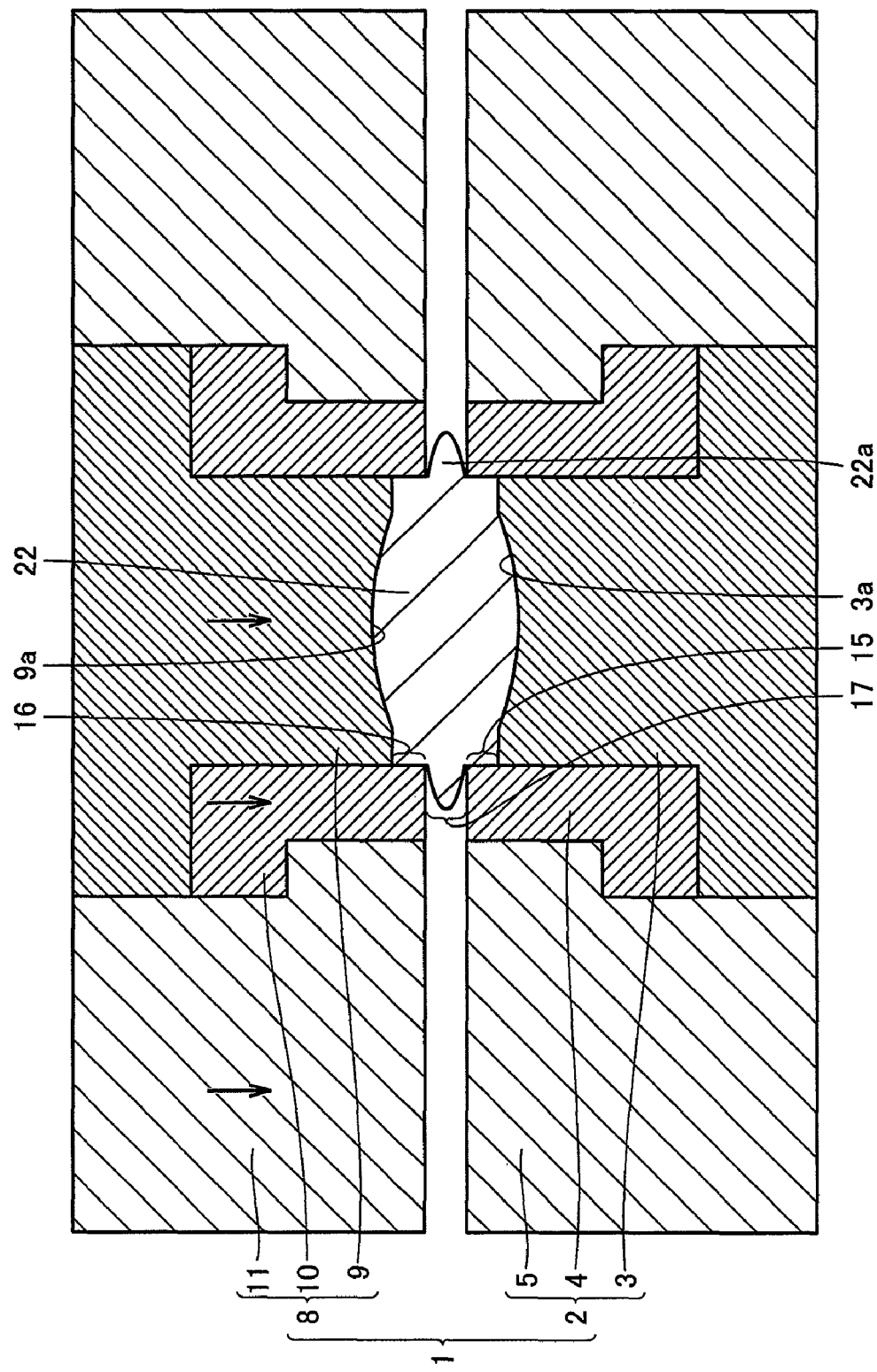
FIG. 11 is a sectional view of a mold according to a sixth embodiment of the present invention.

A sixth embodiment is described with reference to a further mold for manufacturing a biconvex lens. As shown in FIG. 11, a mold 1 is constituted of a cylindrical lower assembly mold section 5 and a lower mold body 3 and a lower sleeve 4 mounted on lower assembly mold section 5 respectively as well as a cylindrical upper assembly mold section 11 and an upper mold body 9 and an upper sleeve 10 mounted on upper assembly mold section 11 respectively, and lower assembly mold section 5 and upper assembly mold section 11 are assembled into a body portion (not shown) of a ceramics molding apparatus. Lower mold body 3 and upper mold body 9 are made of GC, for example. Lower assembly mold section 5 and upper assembly mold section 11 are made of SiC, for example. Lower sleeve 4 and upper sleeve 10 are made of graphite, for example.

Lower mold body 3 is provided with a mirror-finished optical molding surface 3a for molding an optical surface of the lens. Upper mold body 9 is also provided with a mirror-finished optical molding surface 9a for molding the optical surface of the lens. Lower sleeve 4 constitutes a lower periphery constraint portion 15 for molding a peripheral portion of the lens, and upper sleeve 10 constitutes an upper periphery constraint portion 16 for molding the peripheral portion of the lens. Both of the length α1 of the upper periphery constraint portion and the length α2 of the lower periphery constraint portion are set to 0.75 mm. A periphery nonconstraint portion 17 not constraining ceramics when molding a ceramics preform is provided between lower assembly mold section 5 and lower sleeve 4 and upper assembly mold section 11 and upper sleeve 10.

A method of manufacturing a lens with the aforementioned mold 1 is now described. First, a presintered ceramics preform is formed by molding a ceramics preform from ZnS powder and presintering the same by a method similar to the aforementioned method of manufacturing a lens.

Then, the ceramics preform is placed on lower mold body 3, and upper mold body 9, upper sleeve 10 and upper assembly mold section 11 are lowered from above, for holding the ceramics preform between upper mold body 9 and lower mold body 3. Then, the temperature is increased in a vacuum for starting pressurization of the ceramics preform when the temperature reaches about 900° C., the temperature is further increased to reach about 1000° C., and when the pressure reaches 50 MPa, this state is maintained for about 3 minutes (pressure sintering condition B), as shown in FIG. 11.

Thus, a ceramics molded component 22 for forming the lens is molded. Thereafter ceramics molded component 22 is taken out from mold 1, and a lens similar to lens 23 shown in FIG. 6 is formed by removing a radially protruding part 22a remaining on the periphery of ceramics molded component 22.

When the lens manufactured by this method was evaluated, the thickness t of a central portion was 4.0 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, an effect of improvement in productivity and an effect of improvement in reproducibility of pressure sintering conditions can be attained due to the provision of lower assembly mold section 5 and upper assembly mold section 11 assembled into the apparatus body of the ceramic molding apparatus as described above, in addition to the already described effects of improvement in unmoldability, improvement in productivity, stable densification and control of dimensional accuracy.

Stress at the time of pressure-sintering the ceramics preform acts on lower mold body 3 and lower sleeve 4 in a lower mold section 2 and acts on upper mold body 9 and upper sleeve 10 in an upper mold section 8, whereby stress can be prevented from concentrating on only a specific mold section, and the mold can be prevented from breakage.

Further, lower sleeve 4 and upper sleeve 10 are so provided that an effect capable of improving the degree of freedom in design of the mold, an effect of suppressing breakage of the mold, an effect of economy and an effect of control of the dimensional accuracy of the ceramics molded component are attained, as already described.

Seventh Embodiment

Figure 12:
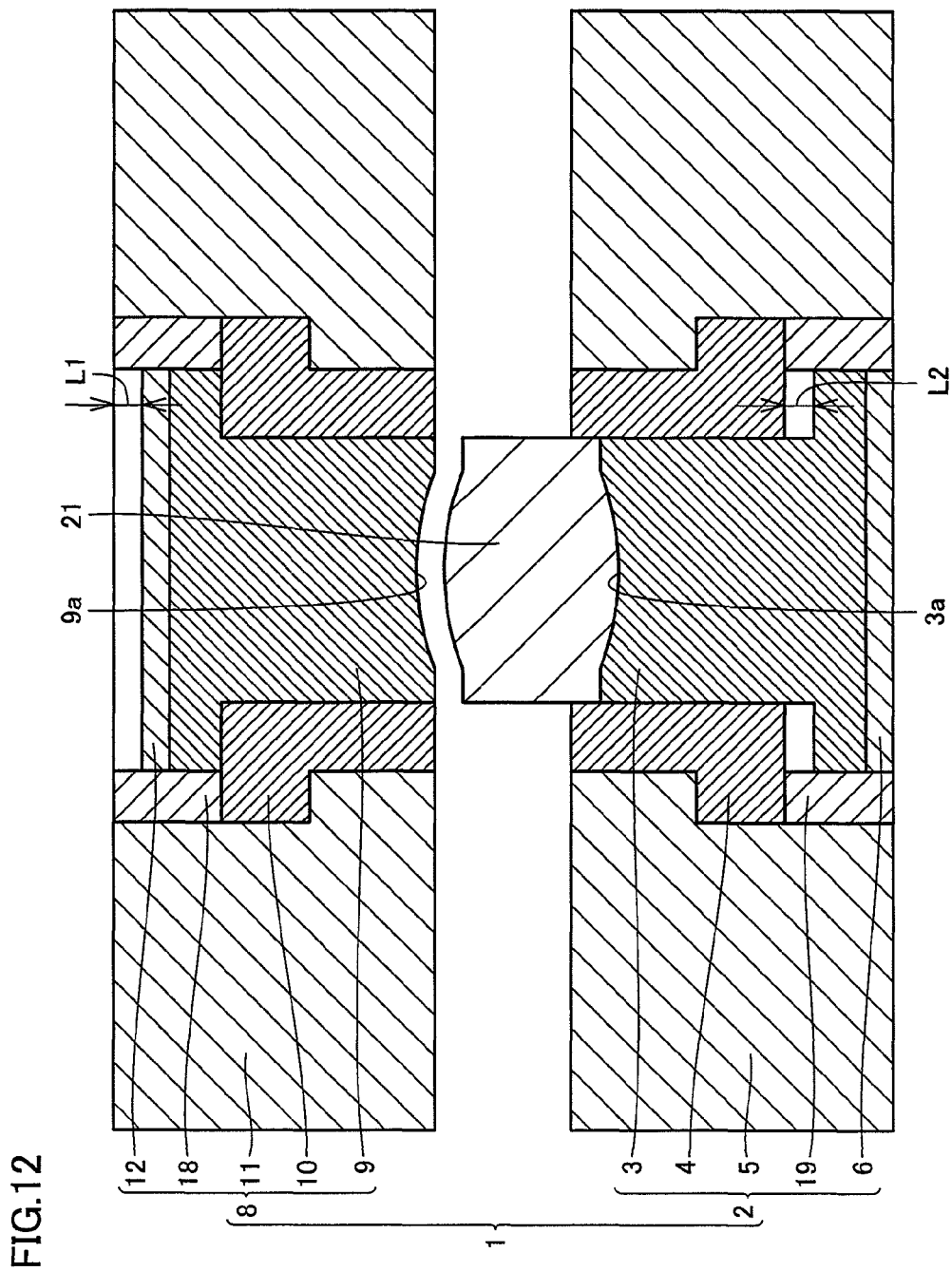
FIG. 12 is a sectional view of a mold according to a seventh embodiment of the present invention, showing one step in a method of manufacturing a ceramics molded component.
Figure 13:
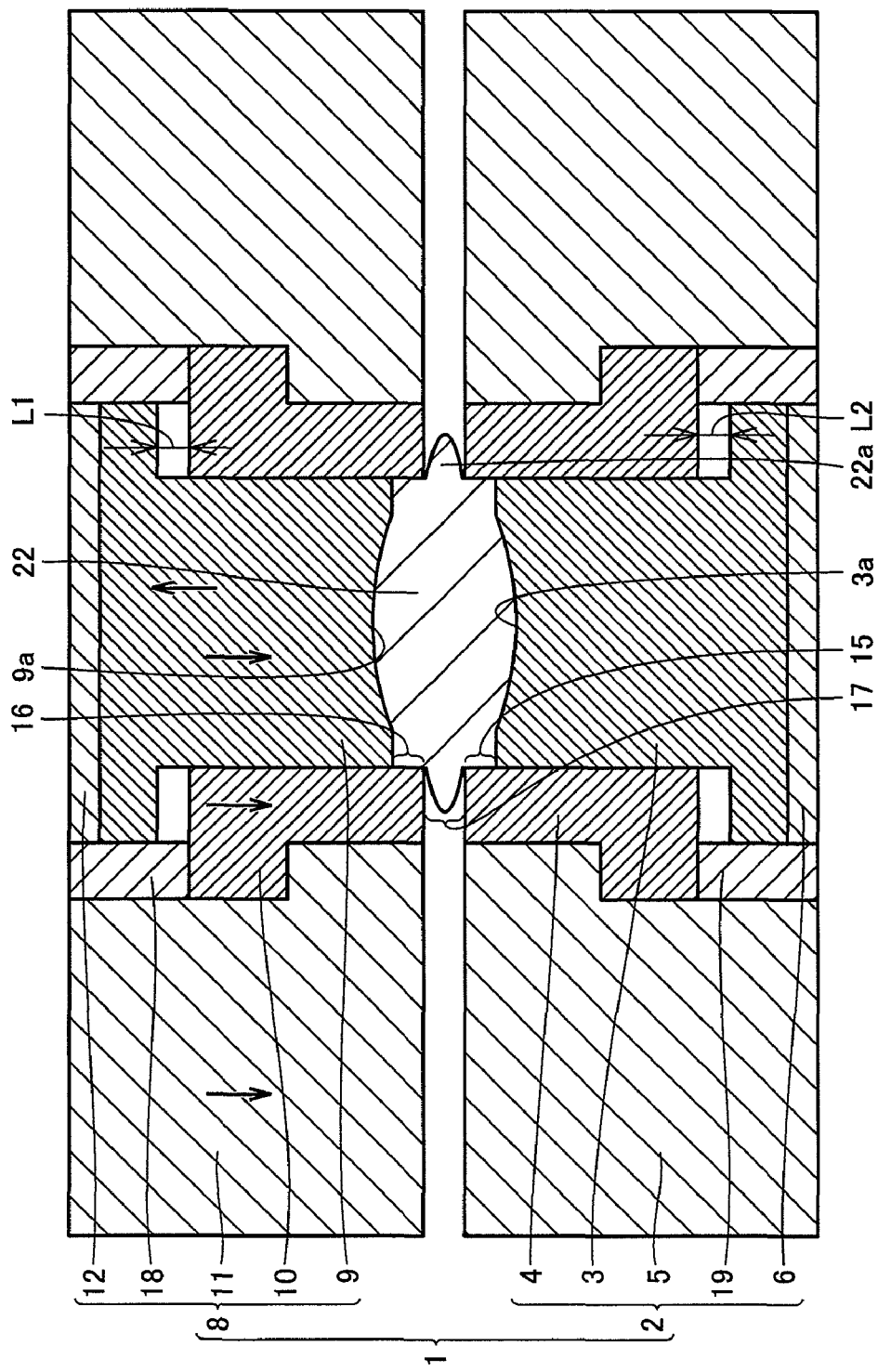
FIG. 13 is a sectional view showing a step carried out after the step shown in FIG. 12 in the seventh embodiment.

A seventh embodiment is described with reference to a further mold for manufacturing a biconvex lens. As shown in FIGS. 12 and 13, a mold 1 is constituted of a cylindrical lower assembly mold section 5 and a lower mold body 3, a lower sleeve 4, a lower press sleeve 19 and a lower spacer 6 mounted on lower assembly mold section 5 respectively as well as a cylindrical upper assembly mold section 11 and an upper mold body 9, an upper sleeve 10, an upper press sleeve 18 and an upper spacer 12 mounted on upper assembly mold section 11 respectively, and lower assembly mold section 5 and upper assembly mold section 11 are assembled into a body portion (not shown) of a ceramics molding apparatus.

Lower mold body 3 and upper mold body 9 are made of GC, for example. Lower assembly mold section 5 and upper assembly mold section 11 are made of graphite, for example. Lower sleeve 4 and upper sleeve 10 are made of GC, for example. Lower press sleeve 19 and upper press sleeve 18 are made of graphite, for example. Lower spacer 6 and upper spacer 12 are made of graphite, for example.

Lower mold body 3 is provided with a mirror-finished optical molding surface 3a for molding an optical surface of the lens. Upper mold body 9 is also provided with a mirror-finished optical molding surface 9a for molding the optical surface of the lens. Lower sleeve 4 constitutes a lower periphery constraint portion 15 for molding a peripheral portion of the lens, and upper sleeve 10 constitutes an upper periphery constraint portion 16 for molding the peripheral portion of the lens. The length of lower periphery constraint portion 15 depends on the thickness of lower spacer 6, and the length of upper periphery constraint portion 16 depends on the thickness of upper spacer 12. In this case, both of the length α1 of the upper periphery constraint portion and the length α2 of the lower periphery constraint portion are set to 0.75 mm. Movable clearances L1 and L2 are provided for allowing movement of upper mold body 9 or lower mold body 3 in a pressure axis direction.

Lower press sleeve 19 and upper press sleeve 18 inhibit lower sleeve 4 and upper sleeve 10 from moving during pressure sintering. A periphery nonconstraint portion 17 not constraining ceramics when molding a ceramics preform is provided between lower assembly mold section 5 and lower sleeve 4 and upper assembly mold section 11 and upper sleeve 10.

A method of manufacturing a lens with the aforementioned mold 1 is now described. First, a presintered ceramics preform is formed by molding a ceramics preform from ZnS powder and presintering the same by a method similar to the aforementioned method of manufacturing a lens.

Then, a ceramics preform 21 is placed on lower mold 3, and upper mold body 9, upper sleeve 10, upper press sleeve 18, upper spacer 12 and upper assembly mold section 11 are lowered from above, for holding ceramics preform 21 between upper mold body 9 and lower mold body 3, as shown in FIG. 12.

Then, a ceramics molded component 22 for forming the lens is molded by sintering and pressurizing the ceramics preform under the aforementioned pressure sintering condition B, as shown in FIG. 13. Thereafter ceramics molded component 22 is taken out from mold 1, and a lens similar to lens 23 shown in FIG. 6 is formed by removing a radially protruding part 22a remaining on the periphery of ceramics molded component 22.

When the lens manufactured by this method was evaluated, the thickness t of a central portion was 4.0 mm, and it was recognized that a dense lens having relative density of 99.8% was obtained. It was also recognized that the lens had an optical characteristic with transmittance of 75% for light having a wavelength of 10 μm.

In the aforementioned method of manufacturing a lens, the following effects are attained in addition to the already described effects of improvement in unmoldability, improvement in productivity, stable densification and control of dimensional accuracy and the effects of improvement in productivity and improvement in reproducibility of the pressure sintering condition resulting from the provision of the lower assembly mold section and the upper assembly mold section:

In mold 1, movable clearances L1 and L2 allowing movement of upper mold body 9 or lower mold body 3 in the pressure axis direction are so provided that upper mold body 9 or the like can be inhibited from so coming into contact with ceramics preform 21 in starting of pressurization that the pressure abruptly acts on ceramics preform 21.

Further, upper mold body 9 and lower mold body 3 can so move in starting of pressurization that ceramics preform 21 is guided to a prescribed optimum position of the mold and displacement can be corrected even if ceramics preform 21 is not placed on the optimum position when placed on lower mold body 3.

In addition, dispersion in simplex weight, thickness, inclination etc. of ceramics preform 21 can be absorbed in pressurization with lower mold body 3 and upper mold body 9 by properly providing the clearances when assembling lower mold body 3, lower sleeve 4, lower spacer 6, upper mold body 9, upper sleeve 10 and upper spacer 12.

Eighth Embodiment

Figure 14:
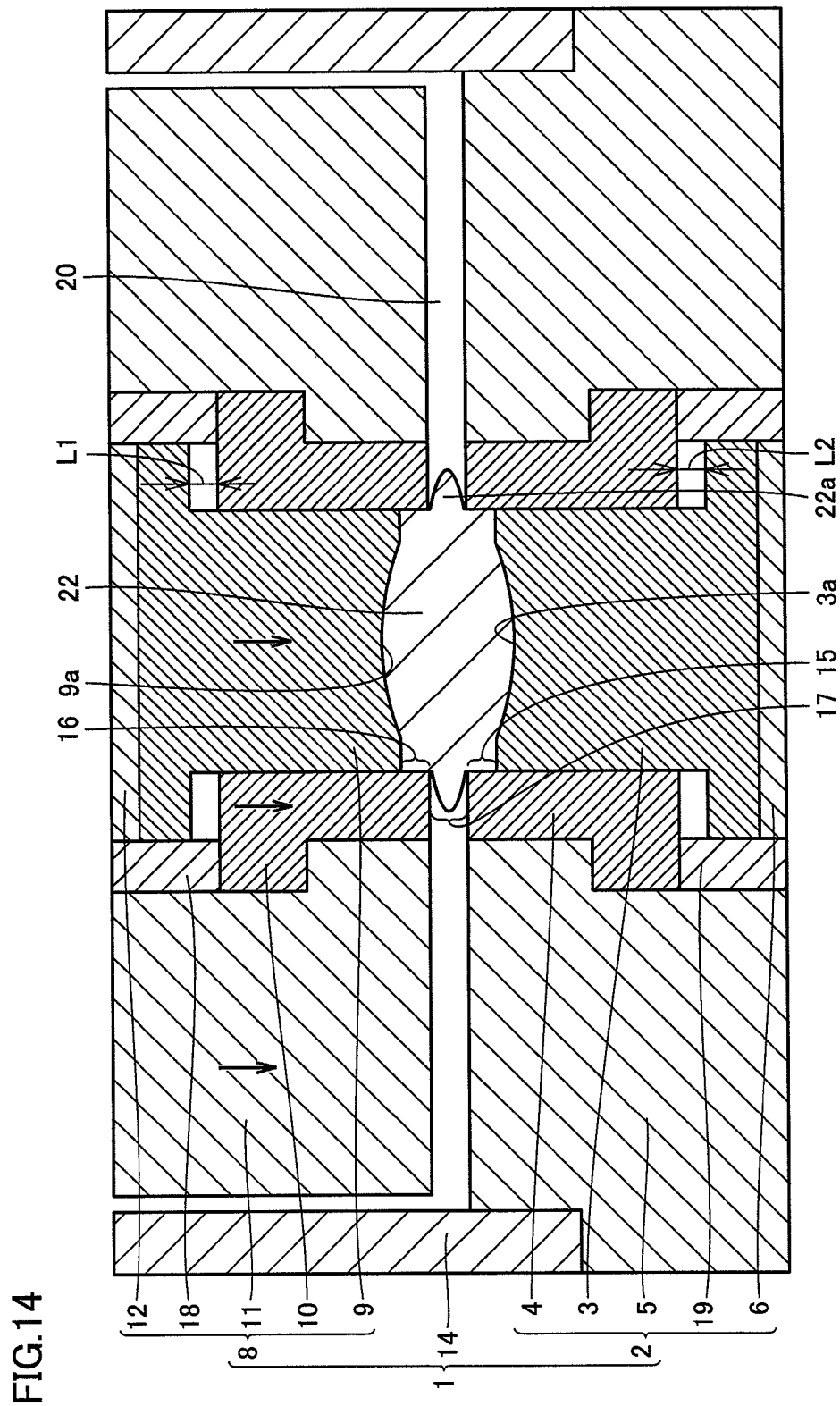
FIG. 14 is a sectional view of a mold according to an eighth embodiment of the present invention.

An eighth embodiment is described with reference to a further mold for manufacturing a biconvex lens. As shown in FIG. 14, a mold 1 is constituted of a cylindrical lower assembly mold section 5 and a lower mold body 3, a lower sleeve 4, a lower press sleeve 19 and a lower spacer 6 mounted on lower assembly mold section 5 respectively, a cylindrical upper assembly mold section 11 and an upper mold body 9, an upper sleeve 10, an upper press sleeve 18 and an upper spacer 12 mounted on upper assembly mold section 11 respectively and a cylindrical sleeve 14 mounted on the periphery of lower assembly mold section 5. Lower assembly mold section 5 and upper assembly mold section 11 are assembled into a body portion (not shown) of a ceramics molding apparatus.

Lower mold body 3 and upper mold body 9 are made of GC, for example. Lower assembly mold section 5 and upper assembly mold section 11 are made of SiC, for example. Lower sleeve 4 and upper sleeve 10 are made of GC, for example. Lower press sleeve 19 and upper press sleeve 18 are made of SiC, or example. Lower spacer 6 and upper spacer 12 are made of SiC, for example. Cylindrical sleeve 14 is made of graphite, for example.

Lower mold body 3 is provided with a mirror-finished optical molding surface 3a for molding an optical surface of the lens. Upper mold body 9 is also provided with a mirror-finished optical molding surface 9a for molding the optical surface of the lens. Lower sleeve 4 constitutes a lower periphery constraint portion 15 for molding a peripheral portion of the lens, and upper sleeve 10 constitutes an upper periphery constraint portion 16 for molding the peripheral portion of the lens. The length of lower periphery constraint portion 15 depends on the thickness of lower spacer 6, and the length of upper periphery constraint portion 16 depends on the thickness of upper spacer 12. In this case, both of the length α1 of the upper periphery constraint portion and the length α2 of the lower periphery constraint portion are set to 0.75 mm. Movable clearances are provided for allowing movement of upper mold body 9 or of lower mold body 3 in a pressure axis direction.

Lower press sleeve 19 and upper press sleeve 18 inhibit lower sleeve 4 and upper sleeve 10 from moving during pressure sintering. A periphery nonconstraint portion 17 not constraining ceramics when molding a ceramics preform is provided between lower assembly mold section 5 and lower sleeve 4 and upper assembly mold section 11 and upper sleeve 10.

A method of manufacturing lenses with a mold assembly comprising three molds 1 described above is now described. In this mold assembly, three main molds each formed by the aforementioned mold 1 excluding lower assembly mold section 5, upper assembly mold section 11 and cylindrical sleeve 14 are arranged in assembly mold sections. First, presintered ceramics preforms are formed by molding ceramics preforms from ZnS powder and presintering the same by a method similar to the aforementioned method of manufacturing a lens.

Then, each ceramic preform is placed on lower mold body 3, and upper mold body 9, upper sleeve 10 and upper assembly mold section 11 are lowered from above for holding the ceramics preform between upper mold body 9 and lower mold body 3. Then, the temperature is increased in a vacuum for starting pressurization of each ceramics preform when the temperature reaches about 900° C., the temperature is further increased to reach about 1000° C., and when the pressure reaches 50 MPa, this state is maintained for about 3 minutes (pressure sintering condition C), as shown in FIG. 14.

Thus, three ceramics molded components 22 for forming the lenses respectively are simultaneously molded. Thereafter each ceramics molded component 22 is taken out from the mold, and a lens similar to lens 23 shown in FIG. 6 is formed by removing a radially protruding part 22a remaining on the periphery of ceramics molded component 22.

When the three lenses manufactured by this method were evaluated respectively, the thickness t of central portions was 4.0 mm in the respective lenses, and it was recognized that dense lenses having relative density of 99.8% were obtained. It was also recognized that the lenses had an optical characteristic with transmittance of 75% for light having a wavelength of 10 μm.

In the aforementioned method of manufacturing lenses, the following effects are attained in addition to the aforementioned various effects including the already described effects of improvement in unmoldability, improvement in productivity, stable densification and control of the dimensional accuracy:

Mold 1 is so provided with cylindrical sleeve 14 that it follows that the ceramics preform is not directly heated but heated (indirectly heated) through cylindrical sleeve 14 when subjected to the pressure sintering. Thus, a soaking property in the mold can be improved.

Further, it follows that cylindrical sleeve 14, upper assembly mold section 11 and lower assembly mold section 5 form a closed space 20 (see FIG. 14). Thus, part of the ceramics preform can be inhibited from sublimating, vaporizing or evaporating when the ceramics preform is pressure-sintered, and weight reduction before and after the pressure sintering can be prevented. While a weight reduction ratio ((weight of ceramics preform−weight of ceramics molded component)/weight of ceramics molded component×100) was 30% in a mold having no closed space, it was confirmed that weight reduction is suppressed (0%) in the aforementioned mold.

Ninth Embodiment

Evaluation of mold detachability (mold releasability) facilitated by chamfering and mirror-finishing molds and mold durability is described. The molds shown in FIGS. 1 and 9 described with reference to the first and fourth embodiments respectively and the molds shown in FIGS. 7, 8 and 10 to 14 described with reference to the second, third and fifth to eighth embodiments respectively were evaluated.

The mold shown in each of FIGS. 1 and 9 is integral mold 1, and lower mold body 3 is provided with optical molding surface 3a and lower periphery constraint portion 15, while upper mold body 9 is provided with optical molding surface 9a and upper periphery constraining portion 16. On the other hand, the mold shown in each of FIGS. 7, 8 and 10 to 14 is separable mold 1, lower mold body 3 and upper mold body 9 are provided with optical molding surfaces 3a and 9a respectively, lower periphery constraint portion 15 is constituted of lower sleeve 4 or lower assembly mold section 5, and upper periphery constraint portion 16 is constituted of upper sleeve 10 or upper assembly mold section 11.

Figure 15:
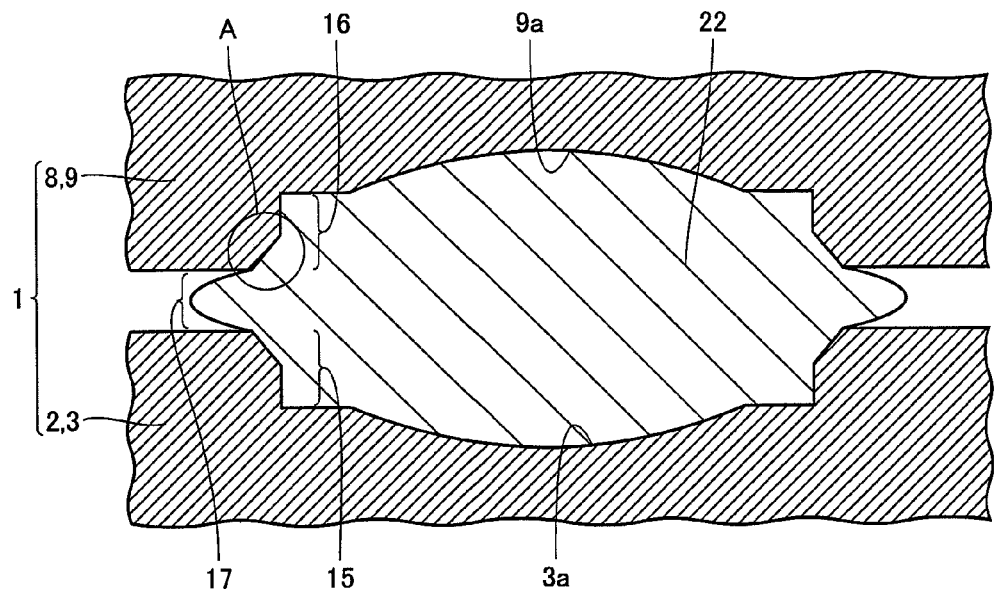
FIG. 15 is a first sectional view showing a chamfered portion of a mold evaluated according to a ninth embodiment of the present invention.
Figure 16:
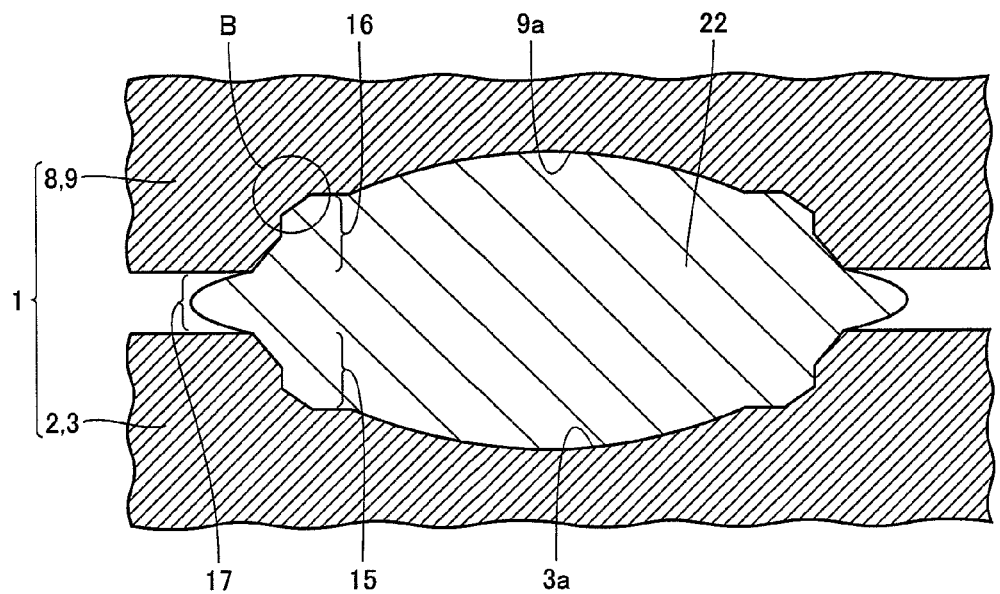
FIG. 16 is a second sectional view showing another chamfered portion of the mold evaluated according to the ninth embodiment.

In each mold 1, detachability (mold releasability) of the mold in a case of performing molding under the aforementioned pressure sintering conditions and durability of the mold at the time of performing molding a prescribed number of times (10000 times) with reference to performance/nonperformance of chamfering and performance/nonperformance of mirror finishing. In each integral mold 1, chamfering was performed on a portion (chamfering 1: R chamfering) between upper (lower) periphery constraint portion 15 or 16 and periphery nonconstraint portion 17 as shown at A in FIG. 15 and another portion (chamfering 2: C chamfering) between upper (lower) periphery constraint portion 15 or 16 and optical molding surface 9a or 3a as shown at B in FIG. 16. R chamfering denotes chamfering on an outer corner protruding outward, and C chamfering denotes chamfering on an inner corner such as a corner of the bottom of a cavity.

Figure 17:
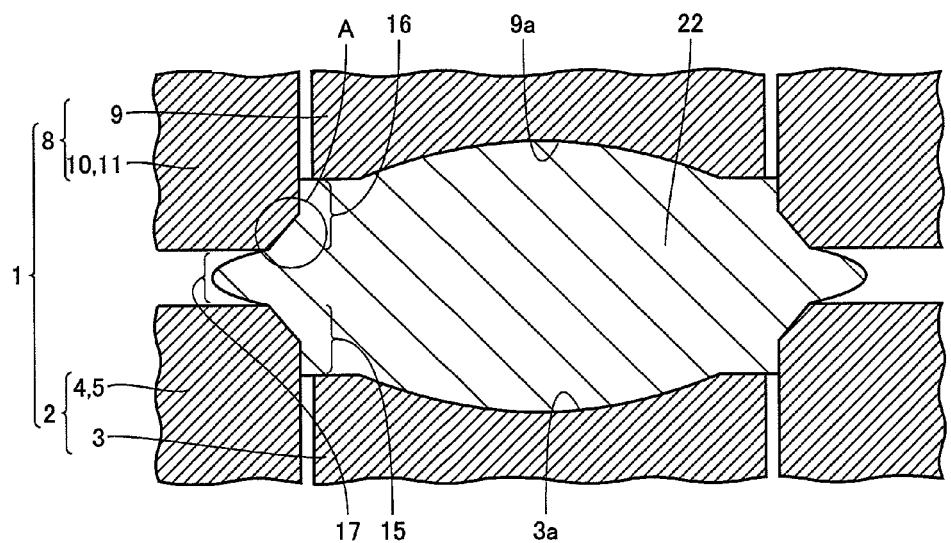
FIG. 17 is a third sectional view showing a chamfered portion of another mold evaluated according to the ninth embodiment.
Figure 18:
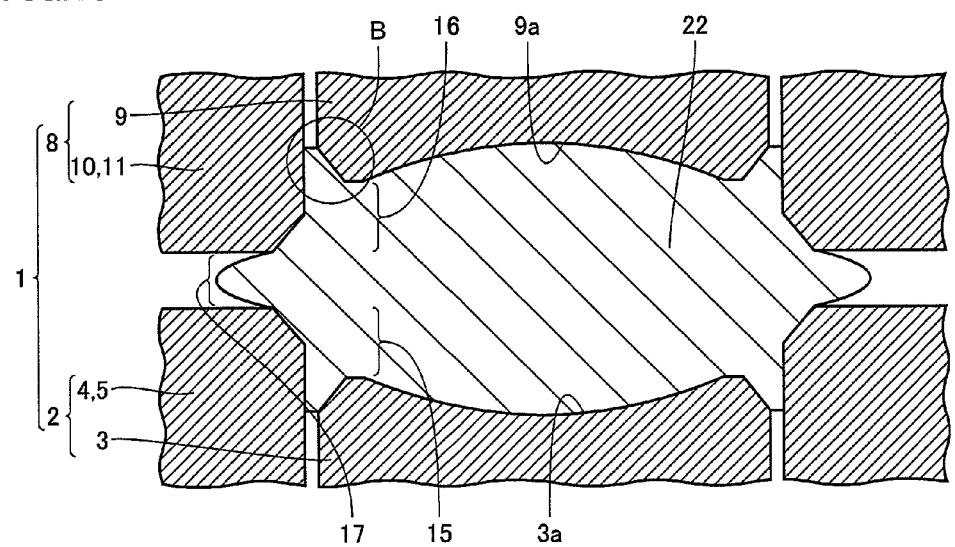
FIG. 18 is a fourth sectional view showing another chamfered portion of the mold evaluated according to the ninth embodiment.

Also in each separable mold, chamfering was performed on a portion (chamfering 1: R chamfering) between upper (lower) periphery constraint portion 15 or 16 and periphery nonconstraint portion 17 as shown at A in FIG. 17 and another portion (chamfering 2: C chamfering) between upper (lower) periphery constraint portion 15 or 16 and optical molding surface 9a or 3a as shown at B in FIG. 18.

FIG. 19 shows the results of the evaluation. Mold structures A to D shown in FIG. 19 correspond to the molds shown in FIGS. 15 to 18 respectively. As shown in FIG. 19, it was demonstrated that the mold is rendered more easily detachable after the pressure sintering as the number of chamfered portions is increased and due to mirror finishing in Example. Further, it was recognized that each Example has no problem with the durability. In comparative example subjected to neither chamfering nor mirror finishing, on the other hand, the mold was hard to detach, and breakage of the mold was recognized.

In particular, a pressure uniformly acts on the corner in the mold when glass which is a material softened and plastically deformed at a high temperature is employed as a molded object, while local stress easily acts in the mold in a case of ceramics requiring a higher pressure for densification as compared with glass and having lower powder fluidity as compared with glass. Therefore, the possibility of breakage of the mold is increased, while such breakage of the mold can be prevented by the performance of chamfering.

Further, while glass softened at a high temperature may penetrate into small gaps in the mold to break the mold or the molded body, powder having lower fluidity as compared with glass does not penetrate into clearances in the mold even if relatively large chamfer(s) and clearances are provided.

Tenth Embodiment

Figure 20:
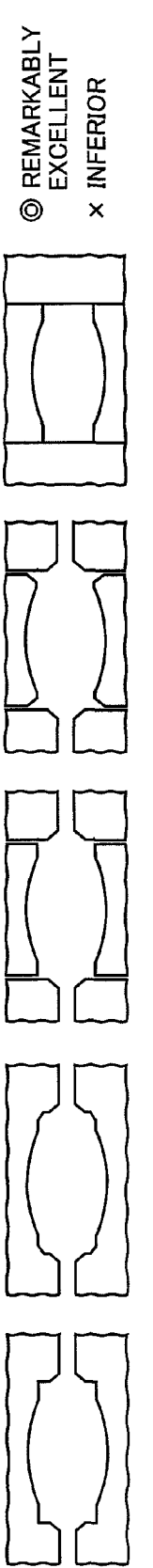
FIG. 20 is a diagram showing results of evaluation in a case of simultaneously forming a plurality of ceramics molded components according to a tenth embodiment of the present invention.

Physical evaluation of dimensional changes etc. of ceramics preforms and ceramics molded components before and after pressure sintering in a case of simultaneously forming a plurality of ceramics sintered bodies is described. The integral molds and the separable molds described with reference to the ninth embodiment were evaluated. On the other hand, a mold according to comparative example comprises absolutely no periphery nonconstraint portion (see the rightmost mold shown in FIG. 20). The aforementioned pressure sintering condition C was employed. FIG. 20 shows the results.

As shown in FIG. 20, it was demonstrated that the pressure-sintered ceramics molded components attained constant values of relative density, dimensional dispersion of the central thicknesses between the ceramics molded components was remarkably reduced and the ceramics molded components were densified even if the central thicknesses and the simplex weights of the ceramics preforms (molded objects) were dispersed in Example. It was also recognized that constant values were obtained as to the transmittance for light having a wavelength of 10 μm.

Further, it was recognized that the molding pressure and the central thickness of each ceramics molded component are correlated and the thickness is reduced as the molding pressure is increased. It was also recognized that all pressure-sintered ceramics preforms can be densified by increasing the molding pressure if the thicknesses and the simplex weights of the ceramics preforms are relatively remarkably dispersed.

On the other hand, it was confirmed that the dimensions of the central thicknesses of pressure-sintered ceramics molded components were remarkably dispersed in comparative example. Further, dispersion was recognized also in relative density and transmittance for light having a wavelength of 10 µm.

Eleventh Embodiment

Evaluation of mold detachability (mold releasability) facilitated by providing draft angles on molds and performing mirror finishing is described. The integral molds and the separable molds described with reference to the ninth embodiment were evaluated. The aforementioned pressure sintering condition C was employed.

Figure 21:
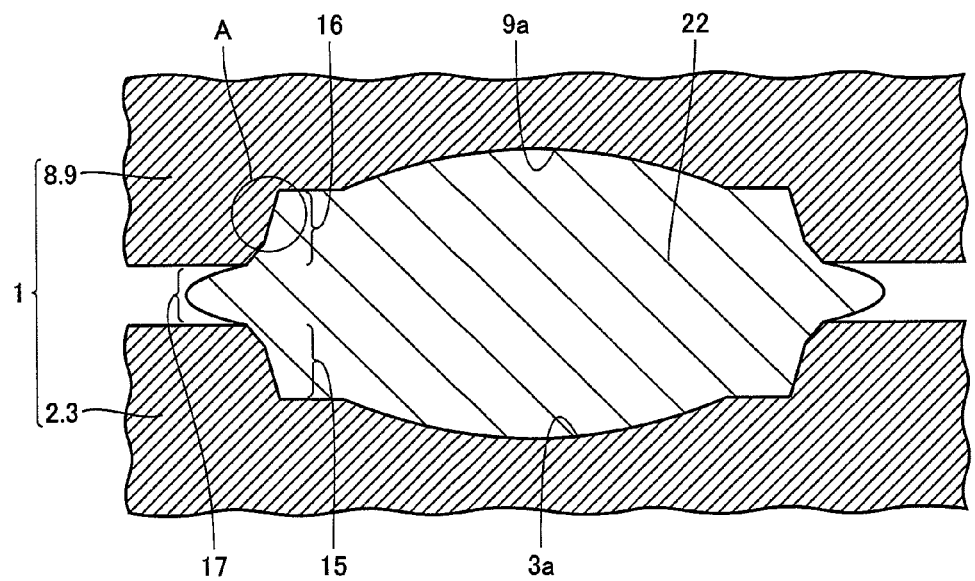
FIG. 21 is a first sectional view showing a portion, provided with a draft angle, of a mold evaluated according to an eleventh embodiment of the present invention.

In each integral mold, the draft angle is provided on a part of lower (upper) periphery constraint portion 15 or 16 provided on lower (upper) mold body 3 or 9 as shown at A in FIG. 21, and the draft angle is so formed that this part of lower (upper) periphery constraint portion 15 or 16 gradually spreads from the side of optical molding surface 3a or 9a toward the side provided with periphery nonconstraint portion 17.

Figure 22:
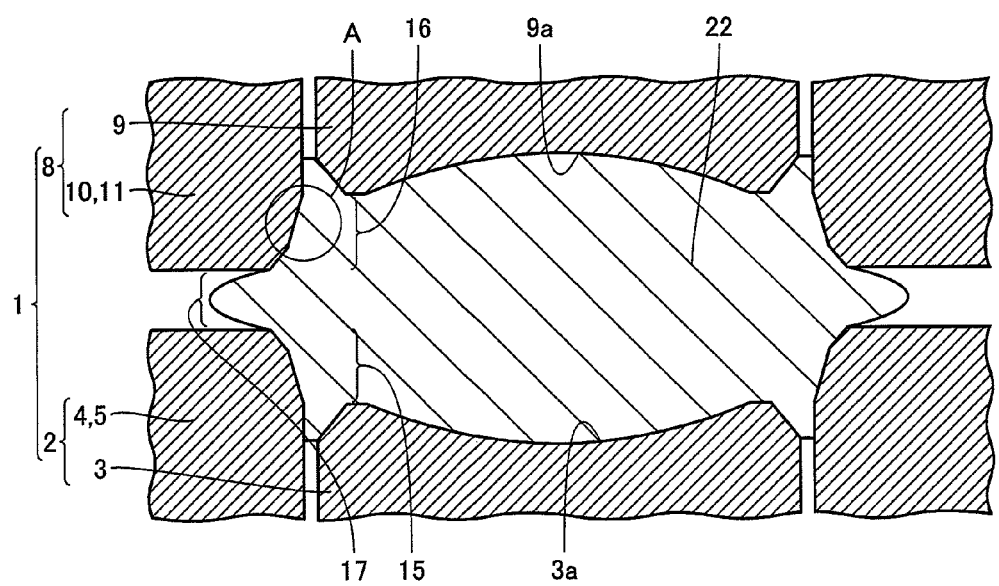
FIG. 22 is a second sectional view showing a portion, provided with a draft angle, of another mold evaluated according to the eleventh embodiment.

In each separable mold, on the other hand, the draft angle is provided on a part of lower (upper) periphery constraint portion 15 or 16 provided on lower (upper) sleeve 4 or 10 or lower (upper) assembly mold section 5 or 11 as shown at A in FIG. 22, and the draft angle is so formed that this part of lower (upper) periphery constraint portion 15 or 16 gradually spreads from the side of optical molding surface 3a or 9a toward the side provided with periphery nonconstraint portion 17.

In other words, the part of lower (upper) periphery constraint portion 15 or 16 is mainly inclined so that the mold separates from ceramics molded component 22 with respect to the direction for detaching upper mold (lower mold) body 9 or 3 in each ceramic mold.

FIG. 23 shows the results of the evaluation. Mold structures A to D shown in FIG. 23 correspond to the molds shown in FIGS. 15 to 18 respectively. As shown in FIG. 23, it was demonstrated that each mold is rendered more easily detachable after the pressure sintering due to mirror finishing performed in addition to the draft angle in Example. On the other hand, it was recognized that the mold is hard to detach in comparative example provided with no draft angle and subjected to no mirror finishing.

Twelfth Embodiment

The relation between the weight etc. of a ceramics preform and the length (thickness) of a periphery constraint portion of a mold and the material of the mold and a ceramics molded component is described as the relation between the mold and a ceramics sintered body molded with the same. The molds provided with the draft angles described with reference to the eleventh embodiment were evaluated. The aforementioned pressure sintering condition C was employed.

FIG. 24 shows the results of the evaluation. As shown in FIG. 24, it was recognized that the central thickness of each of the pressure-sintered ceramics molded components is increased as the thickness ($\alpha 1+\alpha 2$) of the periphery constraint portion is increased if the weight of the ceramics preform remains identical, for example. Further, it was recognized that the central thickness is increased as the weight of the ceramics preform is increased if the thickness of the periphery constraint portion of the mold remains identical.

According to these results, it was recognized necessary to set the weight of the ceramics preform, the thickness of the periphery constraint portion of the ceramics molded component etc. to the optimum combination in order to mold a desired lens. It was recognized that the ceramics molded component is not densified if the thickness of the periphery constraint portion is excessively large as compared with the target final size.

Thirteenth Embodiment

Figure 25:
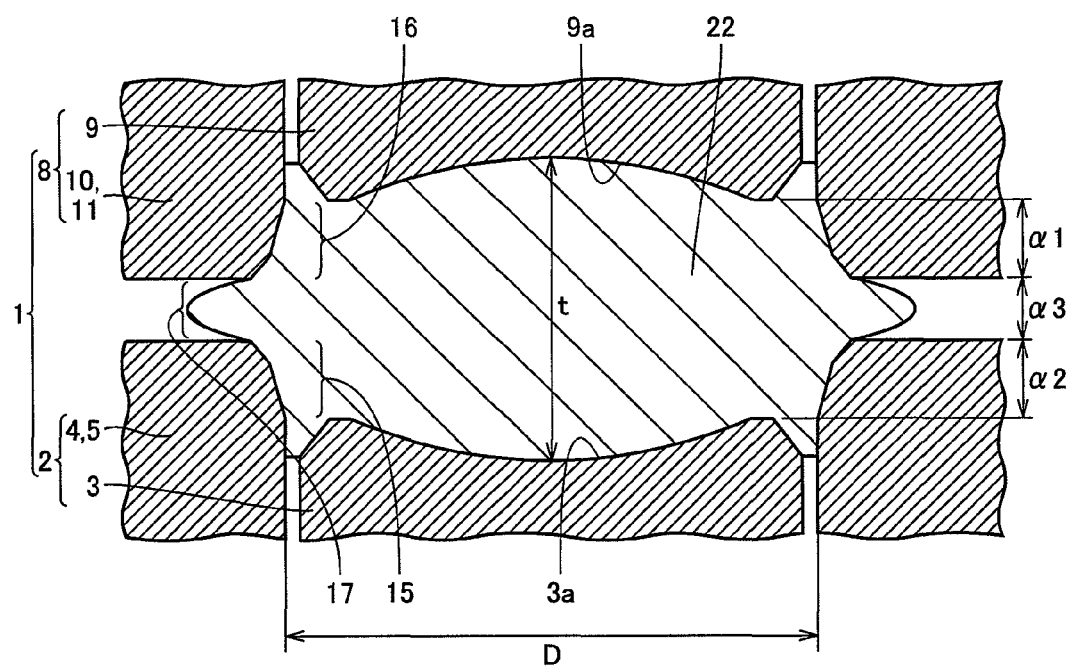
FIG. 25 is a sectional view showing the sizes of respective portions in a mold according to a thirteenth embodiment of the present invention.

The relation between the thickness ratio $\beta$ and the height ratio $\gamma$ of a mold and a ceramics molded component is described as the relation between the mold and the ceramics molded component pressure-sintered with the same. The thickness ratio $\beta$ of the mold denotes the ratio $((\alpha 1+\alpha 2)/\alpha 3)$ between the thickness ($\alpha 1+\alpha 2$) of the periphery constraint portion obtained by adding up the thickness $\alpha 1$ of the upper periphery constraint portion and the thickness $\alpha 2$ of the lower periphery constraint portion and the thickness $\alpha 3$ of the periphery nonconstraint portion, as shown in FIG. 25. The height ratio $\gamma$ denotes the ratio ($\alpha 1+\alpha 2$) between the thickness $\alpha 1$ of the upper periphery constraint portion and the thickness $\alpha 2$ of the lower periphery constraint portion. The thicknesses were measured with a contact type thickness meter.

The molds provided with the draft angles described with reference to the eleventh embodiment were evaluated. The aforementioned pressure sintering condition C was employed. FIG. 26 shows the results. As shown in FIG. 26, it was confirmed as to the relation between the thickness ratio $\beta$ and mold detachability (mold releasability) that the mold is detached when the thickness ratio $\beta$ is at least zero. Such a tendency was recognized that mold releasability is deteriorated if the ratio occupied by the periphery constraint portion is increased and the thickness ratio $\beta$ is increased, while it was recognized that the mold is undetachable if the thickness ratio $\beta$ exceeds 100. On the other hand, it was recognized that the ceramics preform spreads in the peripheral direction and the maximum outer diameter of the ceramics molded component is increased when the ratio occupied by the periphery constraint portion is reduced and the thickness ratio $\beta$ is reduced.

When a ceramics molded component was formed, a protrusion remaining on the periphery was removed, and the densities of a part obtained by removing the protrusion and another part, having been in contact with the periphery constraint portion, continuous therewith were measured by an underwater method, it was recognized that the density in the vicinity of the interface between the part obtained by removing the protrusion and the part having been in contact with the periphery constraint portion was so reduced that this density was less than 95% when the thickness ratio $\beta$ was zero. With this density, water absorption may result from open pores, mechanical strength is reduced, and the ceramics molded component is inferior in practicalness due to deterioration of optical performance. Thus, the thickness ratio $\beta$ is preferably greater than zero and less than 100.

Then, it was confirmed as to the relation between the height ratio $\gamma$ and the mold detachability (mold releasability) that the mold is detached when the height ratio $\gamma$ is at least zero. Such a tendency was recognized that the ceramics molded component sticks to one of the upper mold section and the lower mold section when one of the ratio occupied by the thickness $\alpha 1$ of the upper periphery constraint portion and the ratio occupied by the thickness $\alpha 2$ of the lower periphery constraint portion is increased, and such a tendency was recognized that the ceramics molded component sticks to the upper mold section when the height ratio γ is equal to zero.

When α2=0, i.e., when no lower periphery constraint portion is provided, the ceramics preform spreads in the peripheral direction and the density in the vicinity of the interface is reduced as hereinabove described, whereby it follows to that mechanical strength and optical performance are reduced. Therefore, a desired effective lens diameter must be obtained by preparing a ceramics molded component having a larger diameter and removing a protrusion, the production cost is increased and the productivity is reduced, whereby both of α1 and α2 are preferably greater than zero.

In actual production, the ceramics molded component does not drop if the same does not stick to the side of the upper mold section, whereby automation with a robot can be enabled in transportation of the ceramics molded component. Thus, the height ratio γ is preferably greater than zero, and it was recognized that the height ratio γ is more preferably greater than 1 in order to reliably prevent the ceramics molded component from sticking to the upper mold section.

It was confirmed that the ceramics preform is densified with no problem and an optical characteristic with transmittance of 75% for light having a wavelength of 10 μm is obtained also when the outer diameter of the ceramics preform is more increased.

Fourteenth Embodiment

The relation between the material for the mold and mold detachability (mold releasability) is described.

Figure 27:
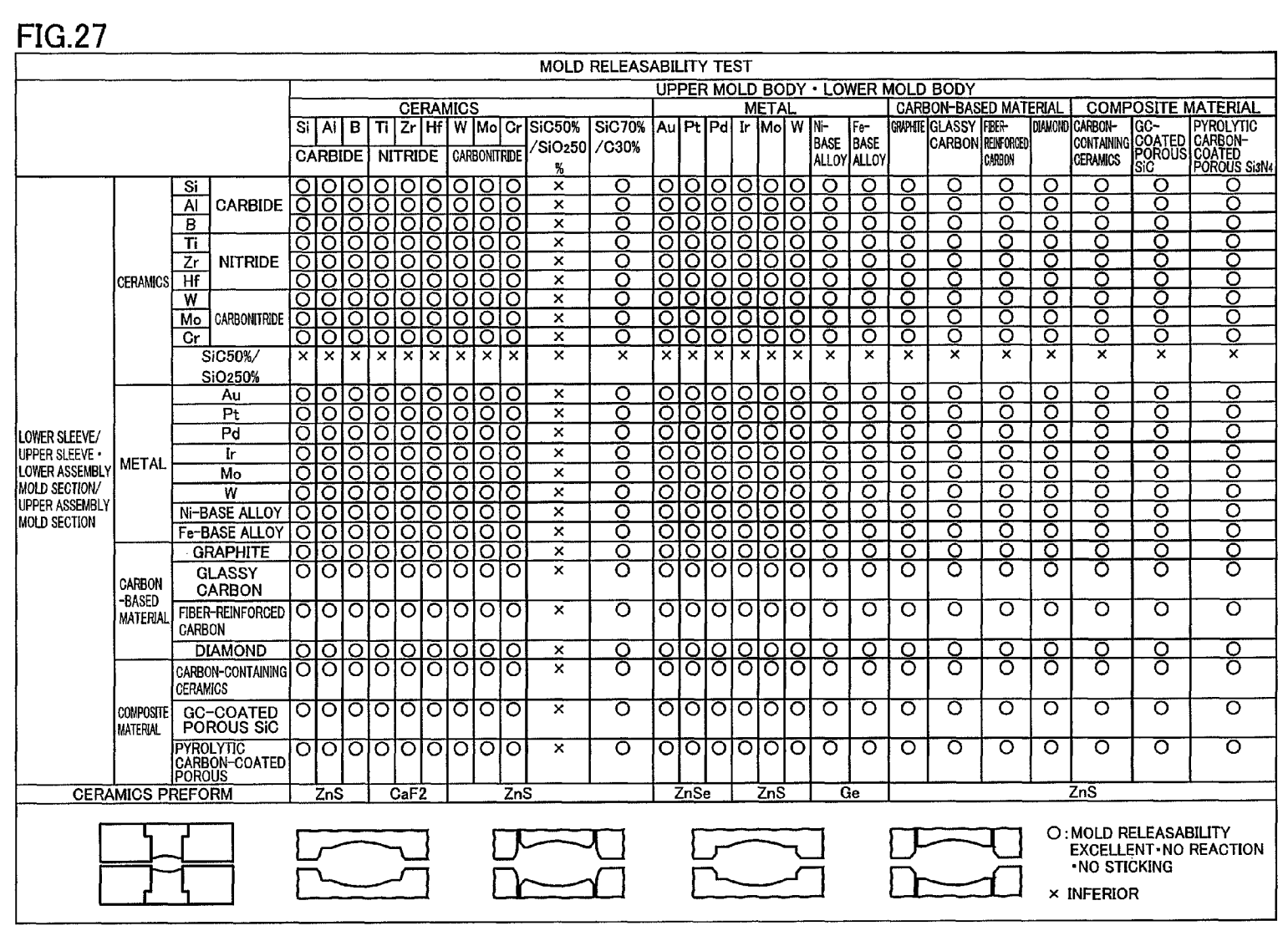

The separable mold described with reference to the fifth embodiment and the molds provided with the draft angles described with reference to the eleventh embodiment were evaluated. The aforementioned pressure sintering condition C was employed. FIG. 27 shows the results.

As shown in FIG. 27, ceramics materials, metallic materials, carbon-based materials and composite materials were applied as the materials for the lower mold bodies, the upper mold bodies, the lower sleeves and the upper sleeves. Carbides, nitrides and carbonitrides each containing at least any element selected from silicon (Si), aluminum (Al), titanium (Ti), zirconium (Zr), hafnium (Hf), tungsten (W), molybdenum (Mo) and chromium (Cr) were applied as the ceramics materials. Any material selected from gold (Au), platinum (Pt), palladium (Pd), iridium (Ir), molybdenum (Mo), tungsten (W), a nickel (Ni)-based heat-resistant alloy and an iron (Fe) heat-resistant alloy was applied as each metallic material. Any material selected from graphite, glassy carbon, a fiber-reinforced carbon composite material, diamondlike carbon and diamond was applied as each carbon-based material.

As shown in FIG. 27, it was confirmed that the ceramics molded component neither reacts with the mold or sticks to the mold but has excellent mold releasability when the ceramics material, the metallic material, the carbon-based material or the composite material is employed as the material for the lower mold body, the upper mold body, the lower sleeve and the upper sleeve.

Particularly when the ceramics material was employed, it was recognized that the ceramics molded component stuck to the mold if the quantity of the carbide was 50 weight % of the overall ceramics material, while it was confirmed that the ceramics molded component did not stick to the mold but was excellent in mold releasability if the quantity was 70 weight %. There is a tendency that the ceramics molded component does not stick to the mold when the quantity of the carbide is increased, whereby it is conceivable that the quantity of the carbide is desirably at least 70 weight % of the ceramics material.

Fifteenth Embodiment

The relation between the material for the mold and slidability is now described. The coefficient of kinetic friction showing movability attained when mutual materials come into contact with each other may be employed as the index of slidability. In general, however, the coefficient of kinetic friction is obtained by the ball-on-disk method shown in Japanese Industrial Standards (JIS R 1613) or the like, and surface roughness is defined due to contact between solids. Slidability in the present invention includes not only slidability resulting from surface roughness but also slidability resulting from difference between surface states. When the coefficient of kinetic friction is employed as slidability, components sliding with each other are targeted.

The integral mold described with reference to the first embodiment, the separable mold described with reference to the fifth embodiment and the separable mold comprising the cylindrical sleeves described with reference to the eighth embodiment were evaluated.

As to the components sliding with each other included in the components constituting these molds, the coefficients of kinetic friction between the components (members 1 and 2) were previously measured with reference to the materials and the surface states of the components, as shown in FIG. 28. Also as to the components sliding with respect to the ceramics preforms included in the components constituting the molds, the coefficients of kinetic friction between the components and the ceramics preforms (members 1 and 2) were previously measured.

Then, the ceramics preforms were pressure-sintered under respective conditions, for evaluating the degrees of molding of the ceramics molded components and the states of the molds. The aforementioned pressure sintering condition C was employed. FIG. 28 shows the results. As shown in FIG. 28, breakage of the sleeves was recognized when the ceramics molded component was detached from the mold if the coefficient of kinetic friction was 0.7. Further, it was recognized impossible to sufficiently densify the ceramics molded component. When the coefficient of kinetic friction was not more than 0.6, on the other hand, it was confirmed that the mold and the ceramics molded component were neither cracked nor chipped. Thus, it is conceivable that the coefficients of kinetic friction of the portions sliding with each other in the mold are preferably set to not more than 0.6

Sixteenth Embodiment

The relation between the thermal expansion coefficient of the ceramics preform and that of the mold is now described. The separable mold described with reference to the fifth embodiment and the molds provided with the draft angles described with reference to the eleventh embodiment were evaluated. ZnS was applied as the ceramics preforms. The aforementioned pressure sintering condition C was employed. The thermal expansion coefficients were measured with the method of measuring thermal expansion by thermomechanical analysis according to Japanese Industrial Standards (JIS R 1618). FIG. 29 shows the results.

As shown in FIG. 29, it was confirmed that the mold or the ceramics molded component is neither cracked nor chipped when the thermal expansion coefficient of the lower (upper)

assembly mold section or the lower (upper) sleeve is less than that of the ceramics preform (molded object).

As to the upper mold body and the lower mold body, a preferable tendency was recognized depending on the shape of an optical element. In other words, the thermal expansion coefficient of the lower mold (upper mold) body is preferably less than that of the ceramics molded component with respect to a convex surface of a lens, since the ceramics sintered body is easily detachable from the ceramics mold in cooling. With respect to a concave surface of the lens, on the other hand, the thermal expansion coefficient of the lower mold (upper mold) body is preferably greater than that of the ceramics molded component, since the ceramics sintered body is easily detachable from the mold in cooling.

Seventeenth Embodiment

Figure 30:
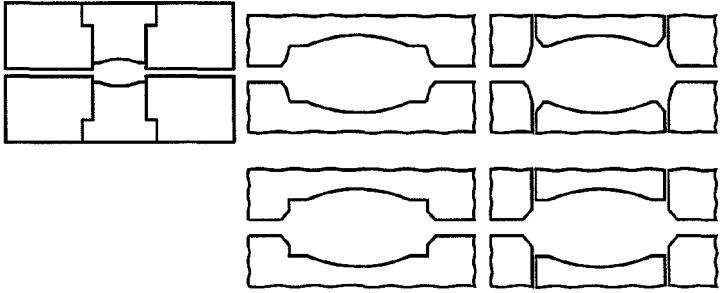
FIG. 30 is a diagram showing results of evaluating the relations between materials for molds according to a seventeenth embodiment of the present invention and thermal conductivity.

The relation between the material for the mold and thermal conductivity is now described. The separable mold described with reference to the fifth embodiment and the molds provided with the draft angles described with reference to the eleventh embodiment were evaluated. The aforementioned pressure sintering condition C was employed. The thermal conductivity was measured by a thermal conductivity test method according to a laser flash method according to Japanese Industrial Standards (JIS R 1611). FIG. 30 shows the results.

As shown in FIG. 30, it was impossible to sufficiently densify the ceramics molded component when the thermal conductivity of the upper mold section and the lower mold section was 2.5 W/mK. When the thermal conductivity of the upper mold section and the lower mold section was at least 3 W/mK, on the other hand, it was possible to densify the ceramics molded component, and it was confirmed possible to achieve relative density of 99.8%. Therefore, it is conceivable that the thermal conductivity of the upper mold section and the lower mold section is preferably at least 3 W/mK.

Eighteenth Embodiment

The melting point etc. of the material constituting the mold, the bending strength and the molding pressure are now described. The separable mold described with reference to the fifth embodiment and the molds provided with the draft angles described with reference to the eleventh embodiment were evaluated. The aforementioned pressure sintering condition C was employed. The bending strength was measured by a bending strength test method according to Japanese Industrial Standards (JIS R 1601). FIG. 31 shows the results. As shown in FIG. 31, it was confirmed that the mold or the ceramics molded component was neither cracked nor chipped when the ratio (bending strength/molding pressure) of the bending strength with respect to the molding pressure was at least 30%.

Figure 32:
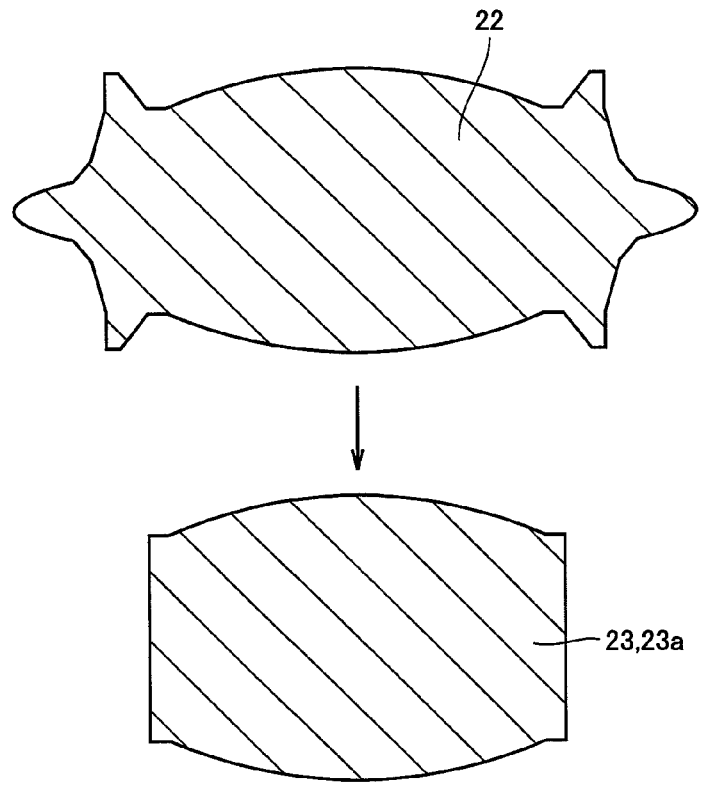
FIG. 32 is a series of step diagrams showing a state of working a pressure-sintered ceramics molded component into a biconvex lens in each embodiment of the present invention.
Figure 33:
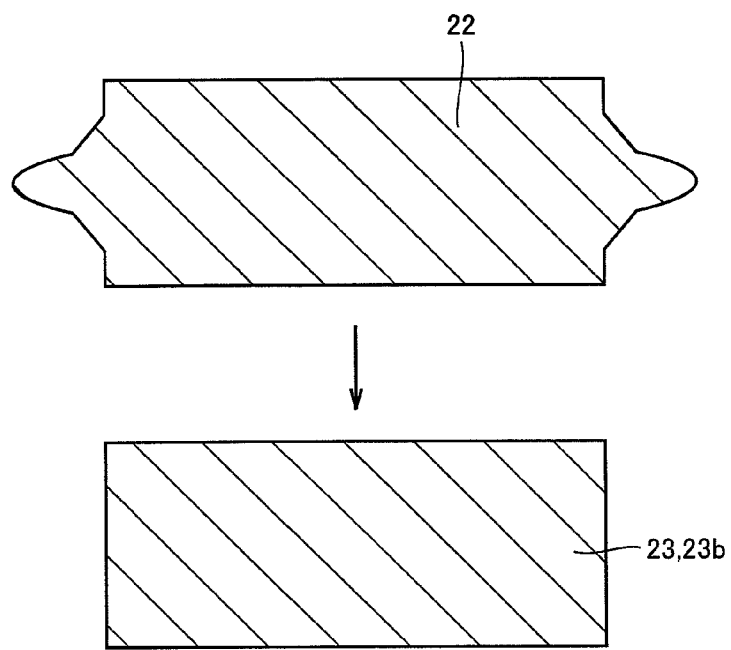
FIG. 33 is a series of step diagrams showing a state of working a pressure-sintered ceramics molded component into a planar lens according to a first modification of each embodiment of the present invention.
Figure 34:
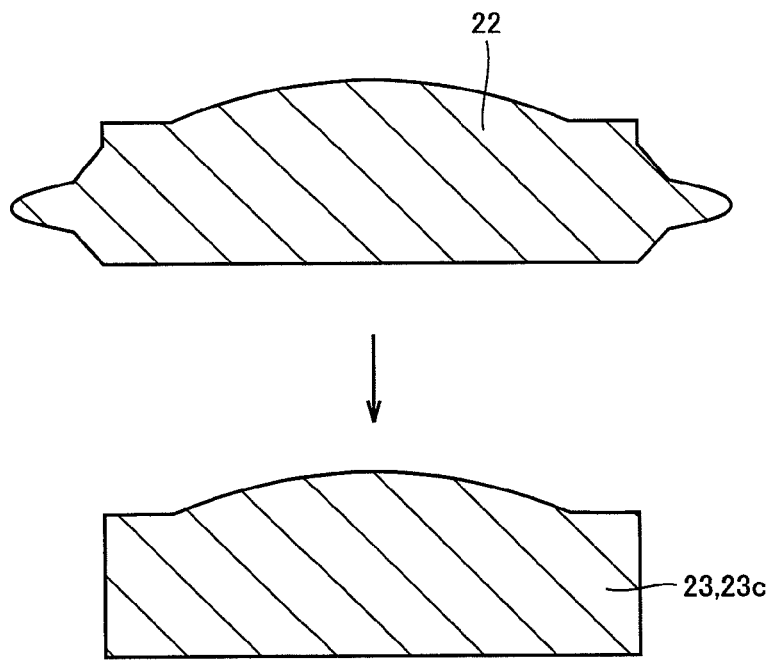
FIG. 34 is a series of step diagrams showing a state of working a pressure-sintered ceramics molded component into a plano-convex lens according to a second modification of each embodiment of the present invention.

While the case of molding a biconvex lens 23a by employing a mold having biconcave surfaces as the mold as shown in FIG. 32 has been mainly described, the mold is not restricted to such a mold having biconcave surfaces, but a planar lens 23b can be molded with a mold having biplanar surfaces, for example, as shown in FIG. 33. Further, a plano-convex lens 23c can be molded with a mold having a concave surface and a planar surface, as shown in FIG. 34.

Figure 35:
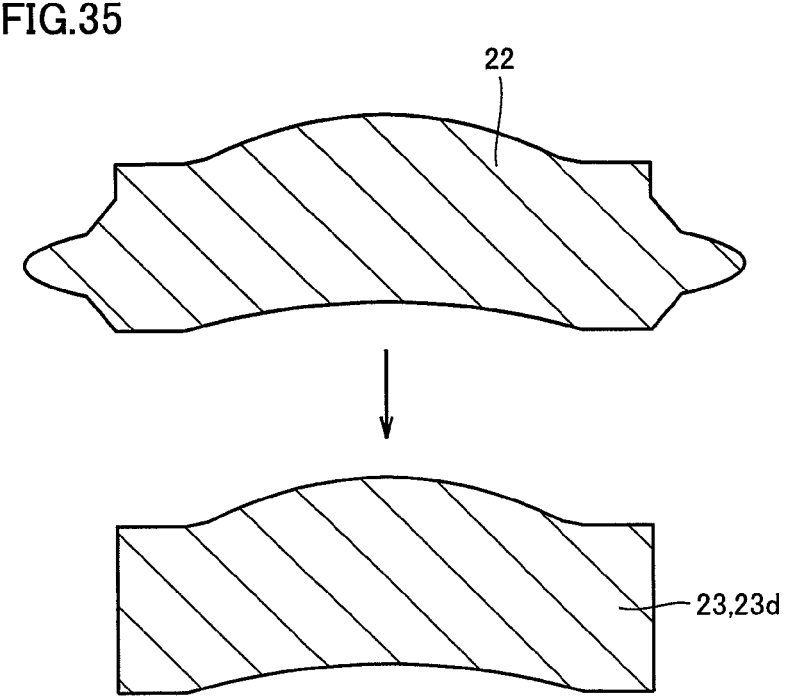
FIG. 35 is a series of step diagrams showing a state of working a pressure-sintered ceramics molded component into a meniscus lens according to a third modification of each embodiment of the present invention.
Figure 36:
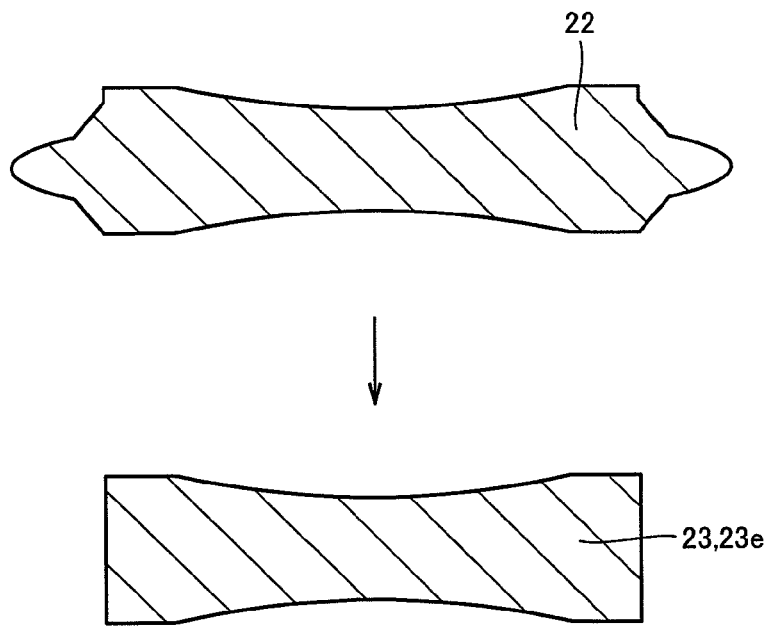
FIG. 36 is a series of step diagrams showing a state of working a pressure-sintered ceramics molded component into a biconcave lens according to a fourth modification of each embodiment of the present invention.
Figure 37:
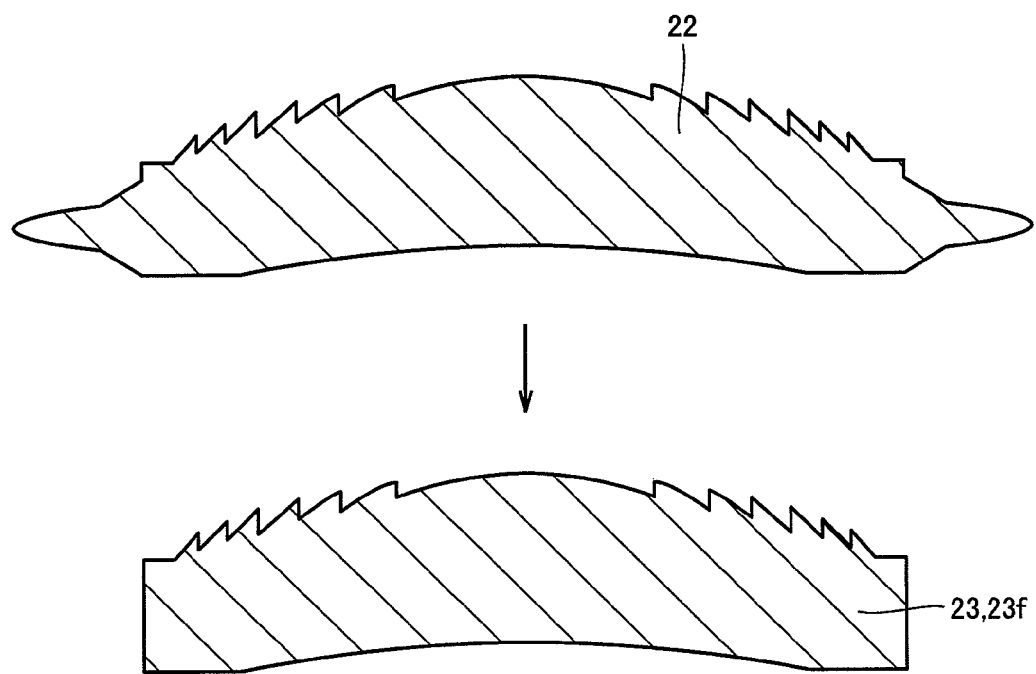
FIG. 37 is a series of step diagrams showing a state of working a pressure-sintered ceramics molded component into a diffraction lens according to a fifth modification of each embodiment of the present invention.

In addition, a meniscus lens 23d can be molded with a mold having a convex surface and a concave surface, as shown in FIG. 35. Further, a biconvex lens 23e can be molded with a mold having biconvex surfaces, as shown in FIG. 36. A diffraction lens 23f can be molded with a mold having a diffraction concavo-convex surface, as shown in FIG. 37.

Nineteenth Embodiment

An exemplary method of manufacturing biconvex lenses among the aforementioned lenses is now described with reference to calcium fluoride employed as ceramics and the mold shown in FIG. 14 employed as the mold. Lower mold body 3, upper mold body 9, lower assembly mold section 5, upper assembly mold section 11, lower sleeve 4, upper sleeve 10, lower press sleeve 19, upper press sleeve 18, lower spacer 6, upper spacer 12 and cylindrical sleeve 14 in mold 1 are made of $Si_3N_4$, for example.

First, a presintered ceramics preform is formed by molding a ceramics preform by pressurizing $CaF_2$ powder by prescribed mold pressing and presintering the same.

Then, the ceramics preform is placed on lower mold body 3, and upper mold body 9, upper sleeve 10 and upper assembly mold section 11 are lowered from above, for holding the ceramics preform between upper mold body 9 and lower mold body 3. Then, the temperature is increased in a vacuum and pressurization of the ceramics preform is started when the temperature reaches about 1100° C., the ceramics preform is further heated until the temperature reaches about 1300° C., and when the pressure reaches 50 MPa, this state is maintained for about 5 minutes (pressure sintering condition D), as shown in FIG. 14.

Thus, a plurality of ceramics molded components 22 for forming the lenses are simultaneously molded. Thereafter each ceramics molded component 22 is taken out from the mold, and a lens similar to lens 23 shown in FIG. 6 is formed by removing a radially protruding part 22a remaining on the periphery of ceramics molded component 22.

When the respective lenses manufactured by this method were evaluated, the thickness t of a central portion was 4.0 mm in each lens, and it was recognized that a dense-transparent lens having relative density of 99.9% was obtained. Further, it was recognized as to the optical characteristic that both of transmittance for light having a wavelength of 8 μm and transmittance for light having a wavelength of 500 nm were 90% in each lens.

Twentieth Embodiment

Another exemplary method of manufacturing biconvex lenses is described with reference to spinel ($MgAl_2O_4$) employed as ceramics and the mold shown in FIG. 14 employed as the mold. Similarly to the case of the aforementioned method, lower mold body 3, upper mold body 9 etc. in mold 1 are made of $Si_3N_4$, for example.

First, a presintered ceramics preform is formed by molding a ceramics preform by pressurizing spinel powder by prescribed mold pressing and presintering the same.

Then, the ceramics preform is placed on lower mold body 3, and upper mold body 9, upper sleeve 10 and upper assembly mold section 11 are lowered from above, for holding the ceramics preform between upper mold body 9 and lower mold body 3. Then, the temperature is increased in an air (atmospheric) atmosphere and pressurization of the ceramics preform is started when the temperature reaches about 1600° C., and when the pressure reaches 40 MPa, this state is maintained for about 5 minutes (pressure sintering condition E), as shown in FIG. 14.

Thus, a plurality of ceramics molded components 22 for forming the lenses are simultaneously molded. Thereafter each ceramics molded component 22 is taken out from the mold, and a lens similar to lens 23 shown in FIG. 6 is formed by removing a radially protruding part 22a remaining on the periphery of ceramics molded component 22.

When the respective lenses manufactured by this method were evaluated, the thickness t of a central portion was 4.0 mm in each lens, and it was recognized that a dense-transparent lens having relative density of 99.9% was obtained. Further, it was recognized that each lens had an optical characteristic with transmittance of 85% for light having a wavelength of 4 μm and an optical characteristic with transmittance of 80% for light having a wavelength of 500 nm.

Figure 38:
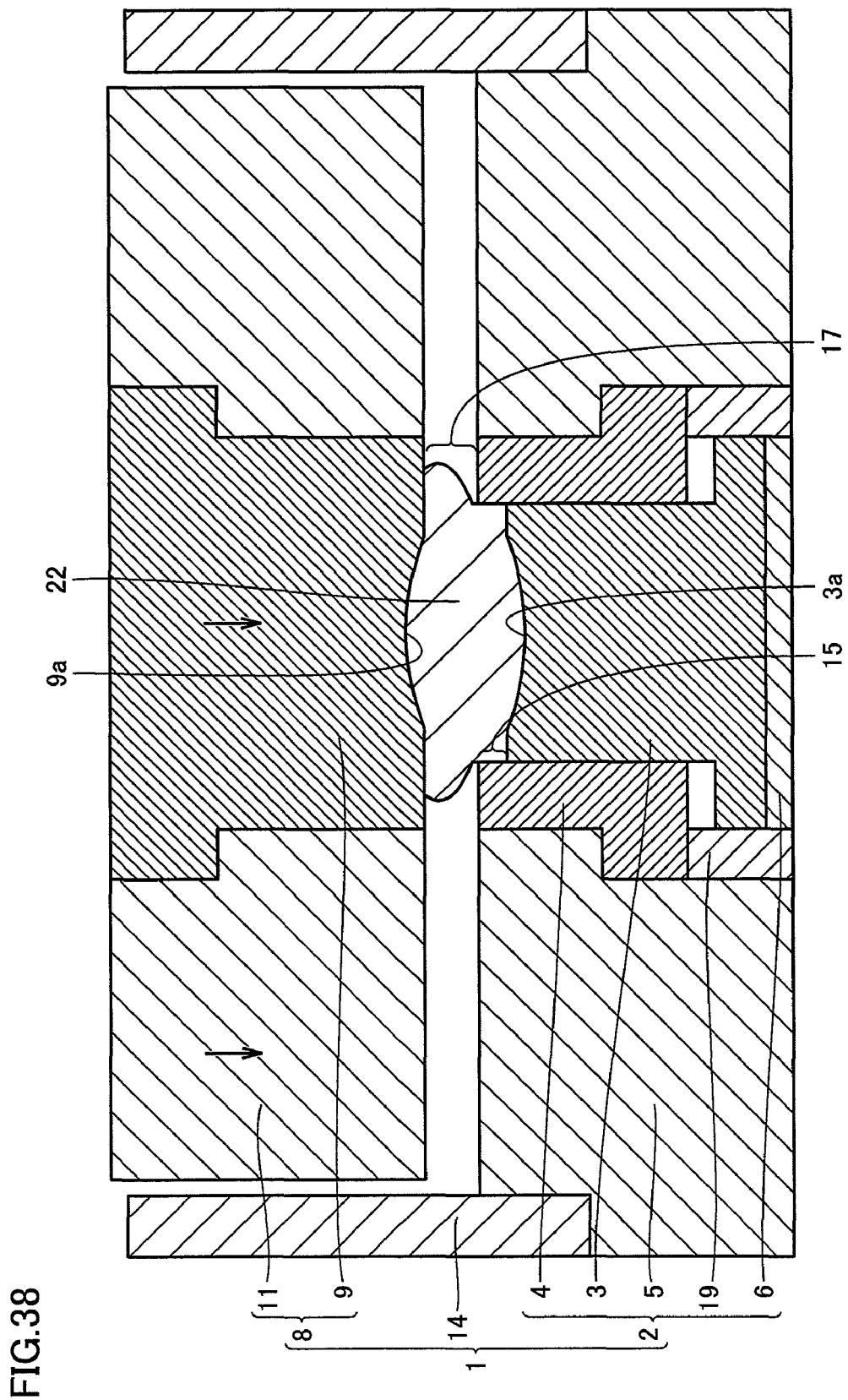
FIG. 38 is a sectional view showing an exemplary mold according to a modification of the mold according to each embodiment of the present invention.

While each of the above embodiments has been described with the illustration of the mold provided with the periphery constraint portions formed on both of the upper mold section and the lower mold section, the periphery constraint portion may alternatively be provided on only either one of the upper mold section and the lower mold section. In a mold 1 shown in FIG. 38, for example, a periphery constraint portion 15 is provided only on a lower mold section 2, and an upper mold section 8 is provided with no periphery constraint portion. Also in such mold 1, a ceramics molded component 22 can be detached from mold 1 without breaking ceramics molded component 22 or mold 1.

The embodiments disclosed this time are illustrations, and the present invention is not restricted to these. The present invention is shown not by the range described in the above but by the scope of claim for patent, and it is intended that all modifications in the meaning and range equivalent to the scope of claim for patent are included.

INDUSTRIAL APPLICABILITY

The present invention is effectively utilized for manufacturing a ceramics molded component.

The invention claimed is:

1. A mold for molding a premolded ceramics preform into a ceramics molded component of a prescribed shape by pressure-sintering the ceramics preform, comprising:
   a lower mold section;
   an upper mold section opposed to said lower mold section;
   a periphery nonconstraint portion provided between said lower mold section and said upper mold section for allowing deformation of the ceramics preform in the peripheral direction; and
   a periphery constraint portion provided on at least either one of said upper mold section and said lower mold section for regulating deformation of the ceramics preform in the peripheral direction for molding the periphery of the ceramics preform,
   wherein a thickness $\alpha$ represents the length of said periphery constraint portion in a pressurization direction, a thickness $\alpha 3$ represents the length of said periphery nonconstraint portion in the pressurization direction and a thickness ratio $\beta$ represents the ratio $\alpha/\alpha 3$ of the thickness $\alpha$ of said periphery constraint portion with respect to the thickness $\alpha 3$ of said periphery nonconstraint portion,
   said thickness ratio $\beta$ is set to be greater than zero and not to exceed 100, and
   wherein, said periphery nonconstraint portion is configured to allow for constant control over the applied pressure when the ceramics preform is pressurized.

2. The mold according to claim 1, wherein said periphery constraint portion includes:
   a lower periphery constraint portion formed on said lower mold section, and
   an upper periphery constraint portion formed on said upper mold section,
   wherein a thickness $\alpha 1$ represents the length of said upper periphery constraint portion in the pressurization direction, a thickness $\alpha 2$ represents the length of said lower periphery constraint portion in the pressurization direction, and the thickness $\alpha$ of said periphery constraint portion in the pressurization direction is the thickness ($\alpha 1+\alpha 2$).

3. The mold according to claim 1, wherein said periphery constraint portion is formed only on one of said lower mold section and said upper mold section.

4. The mold according to claim 1, wherein
   said upper mold section includes an upper mold body,
   said lower mold section includes a lower mold body, and
   said periphery constraint portion is formed on at least either one of said upper mold body and said lower mold body.

5. The mold according to claim 1, wherein said lower mold section includes:
   a cylindrically formed lower sleeve; and
   a lower mold body inserted into said lower sleeve,
   wherein said upper mold section includes:
   a cylindrically formed upper sleeve; and
   an upper mold body inserted into said upper sleeve, and
   wherein said periphery constraint portion is formed on at least either one of said upper sleeve and said lower sleeve.

6. The mold according to claim 1, wherein said lower mold section includes:
   a cylindrically formed lower assembly mold section; and
   a lower mold body inserted into said lower assembly mold section,
   wherein said upper mold section includes:
   a cylindrically formed upper assembly mold section; and
   an upper mold body inserted into said upper assembly mold section, and
   said periphery constraint portion is formed on at least either one of said lower assembly mold section and said upper assembly mold section.

7. The mold according to claim 1, wherein said periphery constraint portion includes:
   an upper periphery constraint portion formed on said upper mold section; and
   a lower periphery constraint portion formed on said lower mold section,
   wherein a part located between said upper periphery constraint portion and said periphery nonconstraint portion and another part located on a side opposite to the side provided with said periphery nonconstraint portion from said upper periphery constraint portion are chamfered respectively in said upper mold section, and
   wherein a part located between said lower periphery constraint portion and said periphery nonconstraint portion and another part located on a side opposite to the side provided with said periphery nonconstraint portion from said lower periphery constraint portion are chamfered respectively in said lower mold section.

8. The mold according to claim 1, wherein said periphery constraint portion includes:
   an upper periphery constraint portion formed on said upper mold section; and
   a lower periphery constraint portion formed on said lower mold section,
   wherein said upper periphery constraint portion is so inclined as to gradually spread outward over a part located on a side opposite to the side provided with said periphery nonconstraint portion in said upper periphery constraint portion and another part located on the side of said periphery nonconstraint portion, and wherein said lower periphery constraint portion is so inclined as to gradually spread outward over a part located on a side opposite to the side provided with said periphery nonconstraint portion in said lower periphery constraint portion and another part located on the side of said periphery nonconstraint portion.

9. The mold according to claim 1, wherein portions molding the prescribed shape of the ceramics molded component are mirror-finished in said lower mold section and said upper mold section.

10. The mold according to claim 1, wherein the coefficient of kinetic friction between materials employed for sliding portions is set to not more than 0.6 in said lower mold section and said upper mold section.

11. The mold according to claim 1, wherein said lower mold section and said upper mold section include portions made of a material having a thermal expansion coefficient less than the thermal expansion coefficient of the ceramics molded component.

12. The mold according to claim 1, wherein the thermal conductivity of said lower mold section and said upper mold section is set to at least 3 W/mK.

13. The mold according to claim 1, wherein said lower mold section and said upper mold section are made of any one of a ceramics material, a metallic material, a carbon-based material and a composite material of these materials.

14. The mold according to claim 1, wherein
the melting point, the glass transition point or the sublimation point of said lower mold section and said upper mold section is in excess of a sintering temperature for sintering the ceramics molded component, and
the bending strength of said lower mold section and said upper mold section at said sintering temperature is set in excess of the molding pressure.

15. The mold according to claim 1, wherein the mold is used to mold the ceramics preform formed from any of ZnS, ZnSe, Ge, Si, $BaF_2$, $CaF_2$, and $MgAl_2O_4$ as ceramics.

16. The mold according to claim 2,
wherein a height ratio γ represents the ratio (α2/α1) of the thickness α2 of said lower periphery constraint portion with respect to the thickness α1 of said upper periphery constraint portion,
said height ratio γ is set greater than zero.

17. The mold according to claim 16, wherein said height ratio γ is set to at least 1.

18. The mold according to claim 3, wherein a part located between said periphery constraint portion and said periphery nonconstraint portion and another part located on a side opposite to the side provided with said periphery nonconstraint portion from said periphery constraint portion are chamfered respectively in said either one of said upper mold section and said lower mold section provided with said periphery constraint portion.

19. The mold according to claim 3, wherein said either one of said upper mold section and said lower mold section provided with said periphery constraint portion is so inclined as to gradually spread outward over a part located on a side opposite to the side provided with said periphery nonconstraint portion in said periphery constraint portion and another part located on the side of said periphery nonconstraint portion.

20. The mold according to claim 4, comprising a barrel mold cylindrically formed for receiving said lower mold body and said upper mold body.

21. The mold according to claim 4, wherein
said lower mold section includes a lower assembly mold section cylindrically formed for receiving said lower mold body, and
said upper mold section includes an upper assembly mold section cylindrically formed for receiving said upper mold body.

22. The mold according to claim 5, comprising a barrel mold cylindrically formed for receiving said lower mold section and said upper mold section.

23. The mold according to claim 5, wherein
said lower mold section includes a lower assembly mold section cylindrically formed for receiving said lower sleeve, and
said upper mold section includes an upper assembly mold section cylindrically formed for receiving said upper sleeve.

24. The mold according to claim 5, wherein said upper mold body and said lower mold body are rendered movable in a pressure axis direction through a prescribed movable clearance.

25. The mold according to claim 23, further comprising a cylindrical sleeve cylindrically formed for receiving said lower mold section and said upper mold section.

26. The mold according to claim 11, wherein said lower mold section and said upper mold section have a thermal expansion coefficient of not more than $3.7 \times 10^{-6}$.

27. The mold according to claim 13, wherein said ceramics material contains a carbide, a nitride and a carbonitride each containing at least any element selected from a group consisting of silicon (Si), aluminum (Al), titanium (Ti), zirconium (Zr), hafnium (Hf), tungsten (W), molybdenum (Mo) and chromium (Cr) by at least 70 weight % of overall said ceramics material.

28. The mold according to claim 13, wherein said metallic material includes any material selected from a group consisting of gold (Au), platinum (Pt), palladium (Pd), iridium (Ir), molybdenum (Mo), tungsten (W), a nickel (Ni)-based heat-resistant alloy and an iron (Fe)-based heat-resistant alloy.

29. The mold according to claim 13, wherein said carbon-based material includes any material selected from a group consisting of graphite, glassy carbon, a fiber-reinforced carbon composite material, diamondlike carbon and diamond.

30. The mold according to claim 13, wherein said carbon-based material includes a material having any material selected from a group consisting of graphite, glassy carbon, a fiber-reinforced carbon composite material, diamondlike carbon and diamond or pyrolytic carbon at least on a surface thereof.

31. The mold according to claim 13, wherein said composite material includes non-oxide ceramics containing said carbon-based material.

32. The mold according to claim 13, wherein said carbon-based material includes at least any material selected from a group consisting of graphite, glassy carbon, carbon nanotube, fullerene, carbon fiber and diamond.

33. The mold according to claim 13, wherein said composite material includes porous ceramics having a carbonaceous coat on a surface thereof.

34. The mold according to claim 33, wherein said carbonaceous coat contains at least any material selected from a group consisting of glassy carbon, pyrolytic carbon, diamondlike carbon and diamond.

35. A mold for molding a premolded ceramics preform into a ceramics molded component of a prescribed shape by pressure-sintering the ceramics preform, comprising:
- a lower mold section;
- an upper mold section opposed to said lower mold section;
- a periphery nonconstraint portion provided between said lower mold section and said upper mold section for allowing deformation of the ceramics preform in the peripheral direction; and
- a periphery constraint portion provided on at least either one of said upper mold section and said lower mold section for regulating deformation of the ceramics preform in the peripheral direction for molding the periphery of the ceramics preform, wherein a thickness $\alpha$ represents the length of said periphery constraint portion in a pressurization direction, a thickness $\alpha 3$ represents the length of said periphery nonconstraint portion in the pressurization direction and a thickness ratio $\beta$ represents the ratio $\alpha/\alpha 3$ of the thickness $\alpha$ of said periphery constraint portion with respect to the thickness $\alpha 3$ of said periphery nonconstraint portion, said thickness ratio $\beta$ is set to be greater than zero and not to exceed 100, and wherein said periphery nonconstraint portion is configured to allow for an application of pressure to the ceramics preform to be constant-pressure controlled.

* * * * *

UNITED STATES PATENT AND TRADEMARK OFFICE
CERTIFICATE OF CORRECTION

| | | |
|---|---|---|
| PATENT NO. | : 8,147,949 B2 | Page 1 of 1 |
| APPLICATION NO. | : 12/307355 | |
| DATED | : April 3, 2012 | |
| INVENTOR(S) | : Masato Hasegawa et al. | |

It is certified that error appears in the above-identified patent and that said Letters Patent is hereby corrected as shown below:

Title Page, Item (54) and Column 1, Line 1, the title of the invention should read:

METHOD OF MANUFACTURING CERAMICS MOLDED COMPONENT AND MOLD EMPLOYED THEREFOR AS WELL AS CERAMICS COMPONENT

Signed and Sealed this
Sixth Day of November, 2012

David J. Kappos
*Director of the United States Patent and Trademark Office*